United States Patent
Takenaka et al.

(10) Patent No.: US 10,730,549 B2
(45) Date of Patent: Aug. 4, 2020

(54) WORK VEHICLE AND METHOD FOR CONTROLLING WORK VEHICLE

(71) Applicant: KOMATSU LTD., Tokyo (JP)

(72) Inventors: Yuita Takenaka, Tokyo (JP); Masanobu Nakabayashi, Tokyo (JP); Masanori Ikari, Tokyo (JP)

(73) Assignee: KOMATSU LTD., Tokyo (JP)

( * ) Notice: Subject to any disclaimer, the term of this patent is extended or adjusted under 35 U.S.C. 154(b) by 82 days.

(21) Appl. No.: 15/556,303

(22) PCT Filed: Oct. 26, 2016

(86) PCT No.: PCT/JP2016/081730
§ 371 (c)(1),
(2) Date: Sep. 7, 2017

(87) PCT Pub. No.: WO2017/073614
PCT Pub. Date: May 4, 2017

(65) Prior Publication Data
US 2018/0037255 A1 Feb. 8, 2018

(30) Foreign Application Priority Data
Oct. 30, 2015 (JP) .................. 2015-213789

(51) Int. Cl.
B62D 6/00 (2006.01)
B62D 12/00 (2006.01)
(Continued)

(52) U.S. Cl.
CPC ............... B62D 6/008 (2013.01); B62D 1/12 (2013.01); B62D 5/006 (2013.01); B62D 5/0832 (2013.01);
(Continued)

(58) Field of Classification Search
CPC ....... E02F 9/0841; E02F 9/2004; E02F 9/225; E02F 3/283; B62D 6/008; B62D 1/12;
(Continued)

(56) References Cited

U.S. PATENT DOCUMENTS 4,730,687 A * 3/1988 Chikuma ................. B62D 6/02
                                                                    180/422
4,800,975 A    1/1989 Oshita et al.
(Continued)

FOREIGN PATENT DOCUMENTS

CN      101003283 A     7/2007
CN      101568460 A    10/2009
(Continued)

OTHER PUBLICATIONS

The extended European search report for the corresponding European application No. 16859843.1, dated Sep. 25, 2018.
(Continued)

Primary Examiner — Anthony R Jimenez
(74) Attorney, Agent, or Firm — Global IP Counselors, LLP

(57) ABSTRACT

An articulated work vehicle with linked front and rear frames includes a joystick lever, a force imparting component, a speed sensor, and a controller. The joystick lever is configured to change a steering angle of the front frame with respect to the rear frame by operation by an operator. The force imparting component is configured to impart an assist force or a counterforce to operation of the joystick lever by the operator. The speed sensor is configured to sense speed of the work vehicle. The controller is configured to control the force imparting component so as to impart the assist force or the counterforce according to the speed sensed by the speed sensor.

11 Claims, 13 Drawing Sheets

(51) Int. Cl.
*B62D 6/02* (2006.01)
*B62D 5/083* (2006.01)
*B62D 5/09* (2006.01)
*B62D 5/00* (2006.01)
*B62D 1/12* (2006.01)
*E02F 9/08* (2006.01)
*E02F 9/20* (2006.01)
*E02F 9/22* (2006.01)
*E02F 3/28* (2006.01)

(52) U.S. Cl.
CPC .............. *B62D 5/091* (2013.01); *B62D 6/02* (2013.01); *B62D 12/00* (2013.01); *E02F 9/0841* (2013.01); *E02F 9/2004* (2013.01); *E02F 9/225* (2013.01); *E02F 3/283* (2013.01)

(58) Field of Classification Search
CPC ........ B62D 5/083; B62D 5/091; B62D 5/006; B62D 6/02; B62D 12/00
USPC ........................................................... 701/41
See application file for complete search history.

(56) References Cited

U.S. PATENT DOCUMENTS

| | | | | |
|---|---|---|---|---|
| 6,179,082 | B1* | 1/2001 | Ikari | ............... B62D 5/06 180/418 |
| 2006/0042838 | A1* | 3/2006 | Yeoman | ............... B62D 9/002 180/6.2 |
| 2007/0168093 | A1 | 7/2007 | Nishiyama | |
| 2008/0041655 | A1 | 2/2008 | Breiner et al. | |
| 2008/0162000 | A1 | 7/2008 | Dattilo et al. | |
| 2010/0307857 | A1 | 12/2010 | Shinagawa | |
| 2012/0217083 | A1 | 8/2012 | Brickner | |
| 2013/0068544 | A1 | 3/2013 | Itou et al. | |
| 2014/0214278 | A1 | 7/2014 | Kuipers et al. | |
| 2016/0319848 | A1 | 11/2016 | Tanaka et al. | |

FOREIGN PATENT DOCUMENTS

| | | |
|---|---|---|
| CN | 102530055 A | 7/2012 |
| CN | 101959741 B | 1/2013 |
| DE | 3537024 C2 | 1/1991 |
| DE | 103 37 954 A1 | 3/2005 |
| JP | 11-105723 A | 4/1999 |
| JP | 11-321664 A | 11/1999 |
| JP | 2000-313350 A | 11/2000 |
| JP | 2002-160660 A | 6/2002 |
| JP | 2005-306184 A | 11/2005 |
| JP | 2015-113039 A | 6/2015 |
| JP | 2015-127164 A | 7/2015 |
| WO | 2008/088515 A1 | 7/2008 |
| WO | 2011/149069 A1 | 12/2011 |
| WO | 2012118709 A2 | 9/2012 |
| WO | 2014116441 A1 | 7/2014 |

OTHER PUBLICATIONS

The International Search Report for the corresponding international application No. PCT/JP2016/081730, dated Jan. 24, 2017.
The Office Action for the corresponding Chinese application No. 201680013276.0, dated Jan. 11, 2019.

* cited by examiner

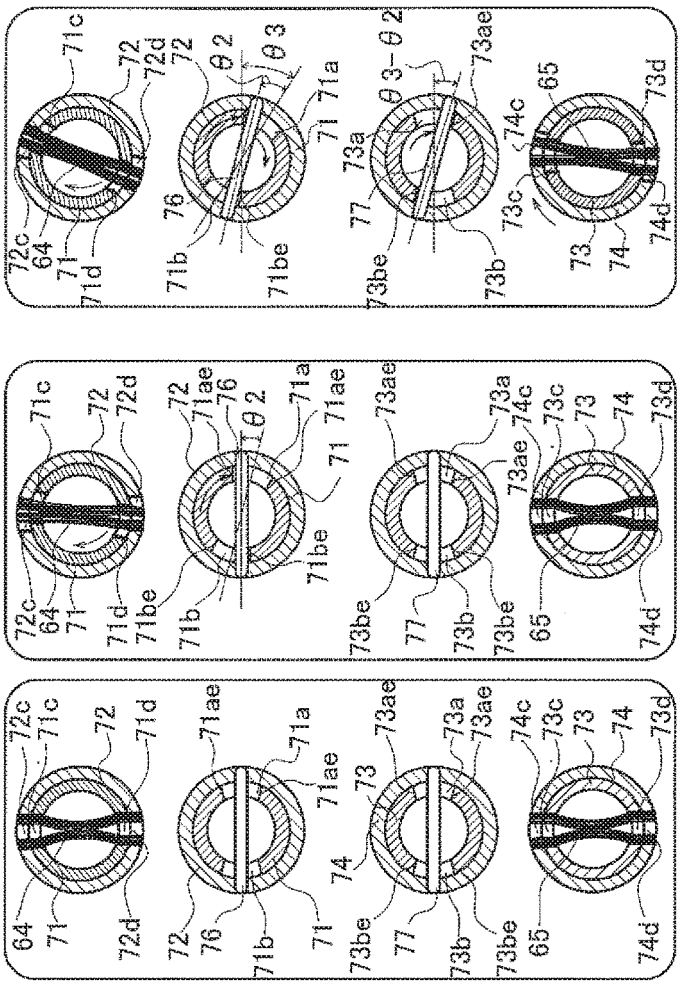
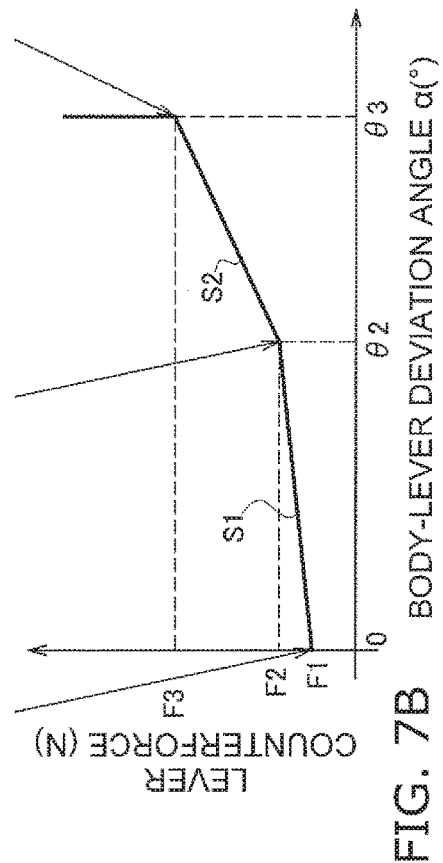
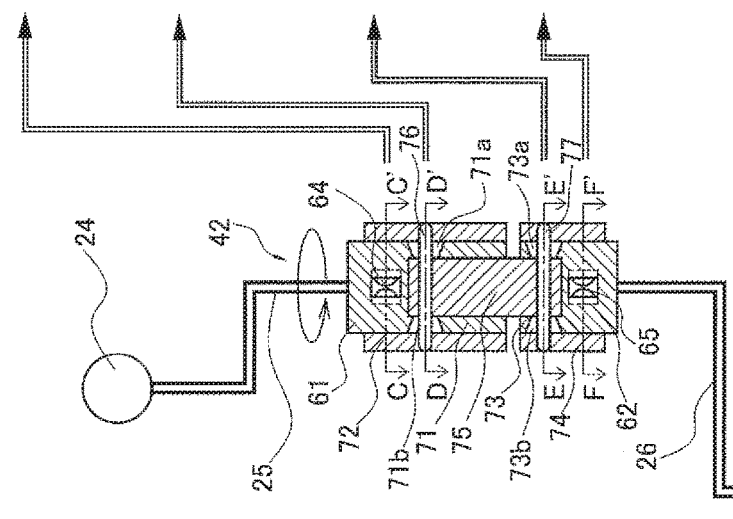

WORK VEHICLE AND METHOD FOR CONTROLLING WORK VEHICLE

CROSS-REFERENCE TO RELATED APPLICATIONS

This application is a U.S. National stage application of International Application No. PCT/JP2016/081730, filed on Oct. 26, 2016. This U.S. National stage application claims priority under 35 U.S.C. § 119(a) to Japanese Patent Application No. 2015-213789, filed in Japan on Oct. 30, 2015, the entire contents of which are hereby incorporated herein by reference.

BACKGROUND

Field of the Invention

The present invention relates to a work vehicle and a method for controlling a work vehicle.

Description of the Related Art

An articulated work vehicle has been disclosed with a configuration in which the steering angle is changed by controlling the flow of fluid supplied to a hydraulic actuator disposed from the front frame to the rear frame (see Japanese Laid-Open Patent Application H11-105723 and Japanese Patent Laid-Open Patent Application 11-321664, for example).

With the work vehicles in Japanese Laid-Open Patent Application H11-105723 and Japanese Patent Laid-Open Patent Application 11-321664, when the operator operates the joystick lever, the open or closed state of the port of a pilot valve changes and the pilot pressure changes. The amount of fluid supplied from the steering valve to the hydraulic actuator is adjusted according to the changed pilot pressure, and the steering angle of the work vehicle is changed.

Since the steering angle thus changes depending on the hydraulic pressure, the operator can change the steering angle by applying a light operating force to the joystick lever, just strong enough to change the open/close state of the port of the pilot valve.

SUMMARY

With the work vehicles of the above-mentioned Japanese Laid-Open Patent Application H11-105723 and Japanese Patent Laid-Open Patent Application 11-321664, however, since the tactile sensation experienced by the operator is determined by the force required to change the open/close state of the port of the pilot valve, even though the speed of the work vehicle is changed, the tactile sensation of the joystick lever to the operator remains the same, which makes it difficult to achieve both improved operability at a low travel speed and linear stability at a high travel speed.

That is, if the tactile sensation is set to be light with an emphasis on improving operability during low-speed travel, linear stability at high speed will be compromised, and if the tactile sensation is set to be heavy with emphasis on linear stability at high speed, operability during low-speed travel will be compromised.

In view of the problems encountered with the above conventional work vehicles, it is an object of the present invention to provide a work vehicle and a work vehicle control method with which operability during low-speed travel and linear stability during high-speed travel can be improved.

The work vehicle pertaining to the first aspect is an articulated work vehicle in which a front frame and a rear frame are linked, comprising a joystick lever, a force imparting component, a speed sensor, and a controller. The joystick lever changes the steering angle of the front frame with respect to the rear frame by operation by an operator. The force imparting component imparts an assist force or a counterforce to operation of the joystick lever by the operator. The speed sensor senses the speed of the work vehicle. The controller controls the force imparting component so as to impart the assist force or the counterforce according to the speed sensed by the speed sensor.

Since an assist force or counterforce can thus be imparted to the operation of the joystick lever according to the speed of the work vehicle, the operating force required to operate the joystick lever can be changed.

Accordingly, operability at low speed and the linear stability at high speed can be improved by setting the force required to operate the joystick lever lower during low-speed travel and setting the force required to operate the joystick lever higher during high-speed travel.

The work vehicle pertaining to the second aspect is the work vehicle pertaining to the first aspect, wherein the controller controls the force imparting component so that the higher is the speed sensed by the speed sensor, the more the operating force required to operate the joystick lever is increased.

Consequently, the operating force required to operate the joystick lever can be increased as the speed rises, either continuously or in steps.

Accordingly, the tactile sensation of the joystick lever becomes heavier at higher speeds, and the tactile sensation of the joystick lever becomes lighter at lower speeds, so operability at low speed and linear stability at high speed can be improved.

The work vehicle pertaining to the third aspect is the work vehicle pertaining to the second aspect, wherein the controller imparts the counterforce when the speed sensed by the speed sensor is at or above a specific preset speed, and controls the force imparting component so as to impart the assist force when the speed sensed by the speed sensor is less than the specific speed.

The tactile sensation can be made heavier by applying a counterforce when the joystick lever is operated while the work vehicle is moving at a high speed, which improves travel stability at high speed.

The work vehicle pertaining to the fourth aspect is the work vehicle pertaining to the second aspect, wherein the controller controls the force imparting component so that the higher is the speed sensed by the speed sensor, the more the assist force imparted to the joystick lever is decreased.

Consequently, the operating force required to operate the joystick lever can be increased as the speed rises, either continuously or in steps, and operability at low speed and linear stability at high speed can be improved.

The work vehicle pertaining to the fifth aspect is the work vehicle pertaining to the first aspect, further comprising a torque sensor. The controller controls the force imparting component so as to impart an assist force or a counterforce to operation of the joystick lever according to the torque sensed by the torque sensor.

Consequently, a force can be applied according to the torque applied by the operator to the joystick lever. For example, the amount of force imparted can be controlled so that the assist force imparted by the force imparting component is increased when the torque applied to the joystick lever by the operator is high, and the assist force is decreased when the torque is low.

The work vehicle pertaining to the sixth aspect is the work vehicle pertaining to the first aspect, comprising a hydraulic actuator and a controller. The hydraulic actuator changes the steering angle. The control valve is linked to the joystick lever and controls the flow of fluid supplied to the hydraulic actuator. The control valve has a first input member, a second input member, and a biasing component. The first input member is linked to the joystick lever and is displaced according to the amount of operation of the joystick lever. The second input member is displaced according to the steering angle. The biasing component biases the first input member to a neutral position where the amount of displacement of the first input member matches the amount of displacement of the second input member. The controller controls the flow of fluid supplied to the hydraulic actuator according to the difference between the amount of displacement of the first input member with respect to the amount of displacement of the second input member. The joystick lever is operated against the biasing force produced by the biasing component.

Consequently, after the joystick lever is operated, the steering angle changes to follow the joystick lever, and the control valve is in the neutral position when the operation amount of the joystick lever matches the steering angle.

Also, the biasing component is thus provided to the control valve, and the operator operates the joystick lever with an operating force that goes against the biasing force produced by the biasing component. An assist force or a counterforce can be imparted to operation against this biasing force.

The work vehicle pertaining to the seventh aspect is the work vehicle pertaining to the sixth aspect, further comprising a steering valve. The steering valve adjusts the flow of fluid supplied to the hydraulic actuator on the basis of the pilot pressure inputted from the control valve. The control valve controls the flow of fluid supplied from the steering valve to the hydraulic actuator by adjusting the pilot pressure.

Consequently, the pilot pressure is adjusted by operator operation, the amount of fluid supplied from the steering valve to the hydraulic actuator is controlled, and the steering angle of the front frame with respect to the rear frame is changed.

The work vehicle pertaining to the eighth aspect is the work vehicle pertaining to the first aspect, further comprising a hydraulic actuator, a control valve, and a link. The hydraulic actuator changes the steering angle. The control valve is linked to the joystick lever and controls the flow of fluid supplied to the hydraulic actuator. The link links the control valve to the joystick lever. The force imparting component has an electric motor and a transmission mechanism. The electric motor generates the assist force or the counterforce. The transmission mechanism transmits the assisting force or the counterforce produced by the electric motor to the link.

Consequently, the force of the electric motor can be transmitted to the link that links the joystick lever to the control valve, and the force required to operate the joystick lever can be changed.

The method for controlling a work vehicle pertaining to the ninth aspect is a method for controlling an articulated work vehicle in which a front frame and a rear frame are linked, said method comprising a speed sensing step and an imparting step. The speed sensing step involves sensing the speed of the work vehicle. The imparting step involves imparting an assist force or a counterforce according to the sensed speed to the operation of a joystick lever that changes the steering angle of the front frame with respect to the rear frame.

Since an assist force or a counterforce can thus be imparted to the operation of the joystick lever according to the speed of the work vehicle, the operating force required to operate the joystick lever can be changed.

Therefore, operability at low speed and linear stability at high speed can be improved by setting the force required to operate the joystick lever to be low during low-speed travel and setting the force required to operate the joystick lever to be high during high-speed travel.

Effects of the Invention

The present invention provides a work vehicle and a method for controlling a work vehicle with which operability at low speed and linear stability at high speed can be improved.

BRIEF DESCRIPTION OF DRAWINGS

FIG. 7A is a simplified diagram of the pilot valve in FIG. 3, FIG. 7B is a graph of the relation between the lever counterforce and the body-lever angular deviation in the pilot valve in FIG. 7A, FIG. 7C is a cross section along the CC', DD', EE', and FF' lines in FIG. 7A when the angular deviation α is zero, FIG. 7D is a cross section along the CC', DD', EE', and FF' lines in FIG. 7A when the angular deviation α is θ2, and FIG. 7E is a cross section along the CC', DD', EE', and FF' lines in FIG. 7A when the angular deviation α is θ3;

DETAILED DESCRIPTION OF EMBODIMENT(S)

A wheel loader in an embodiment pertaining to the present invention will now be described through reference to the drawings.

Embodiment 1

1. Configuration
1-1. Overview of Wheel Loader Configuration

Figure 1:
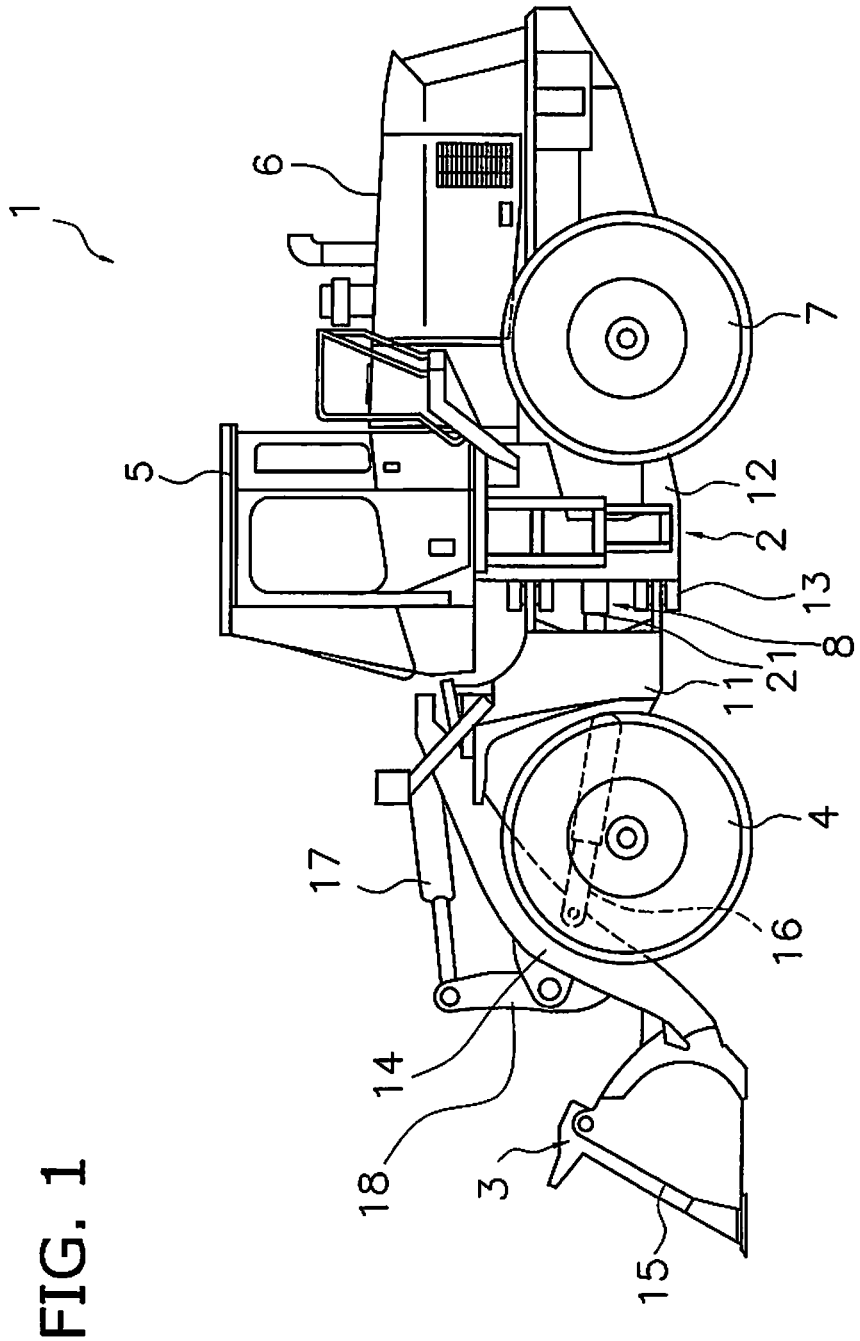
FIG. 1 is a side view of a wheel loader in an embodiment pertaining to the present invention.

FIG. 1 is a simplified diagram of the configuration of a wheel loader 1 in this embodiment. The wheel loader 1 in this embodiment comprises a body frame 2, a work implement 3, a pair of front tires 4, a cab 5, an engine compartment 6, a pair of rear tires 7, and a steering operating device 8 (see FIG. 2, discussed below).

The wheel loader 1 performs earth loading and other such work with the work implement 3.

The body frame 2 is what is known as an articulated type, and has a front frame 11, a rear frame 12, and a linking shaft 13. The front frame 11 is disposed in front of the rear frame 12. The linking shaft 13 is provided in the center of the vehicle width direction, and pivotably links the front frame 11 to the rear frame 12. The front tires 4 are attached on the left and right sides of the front frame 11. The rear tires 7 are attached on the left and right sides of the rear frame 12.

The work implement 3 is driven by hydraulic fluid from a work implement pump (not shown). The work implement 3 has a boom 14, a bucket 15, a lift cylinder 16, and a bucket cylinder 17. The boom 14 is mounted on the front frame 11. The bucket 15 is attached to the distal end of the boom 14.

The lift cylinder 16 and the bucket cylinder 17 are hydraulic cylinders. One end of the lift cylinder 16 is attached to the front frame 11, and the other end of the lift cylinder 16 is attached to the boom 14. The lift cylinder 16 telescopes in and out to pivot the boom 14 up and down. One end of the bucket cylinder 17 is attached to the front frame 11, and the other end of the bucket cylinder 17 is attached to the bucket 15 via a bell crank 18. The bucket cylinder 17 telescopes in and out to pivot the bucket 15 up and down.

The cab 5 is mounted on the rear frame 12, inside of which are disposed a steering wheel or joystick lever 24 (discussed below; see FIG. 2) for steering, a lever for controlling the work implement 3, various display devices, and so forth. The engine compartment 6 is disposed on the rear frame 12 to the rear of the cab 5, and houses an engine.

The steering operating device 8 will be discussed in detail below, but has steering cylinders 21 and 22. The amount of fluid supplied to the steering cylinders 21 and 22 is varied to change the steering angle of the front frame 11 with respect to the rear frame 12 and to change the travel direction of the wheel loader 1.

1-2. Steering Operation Device

Figure 2:
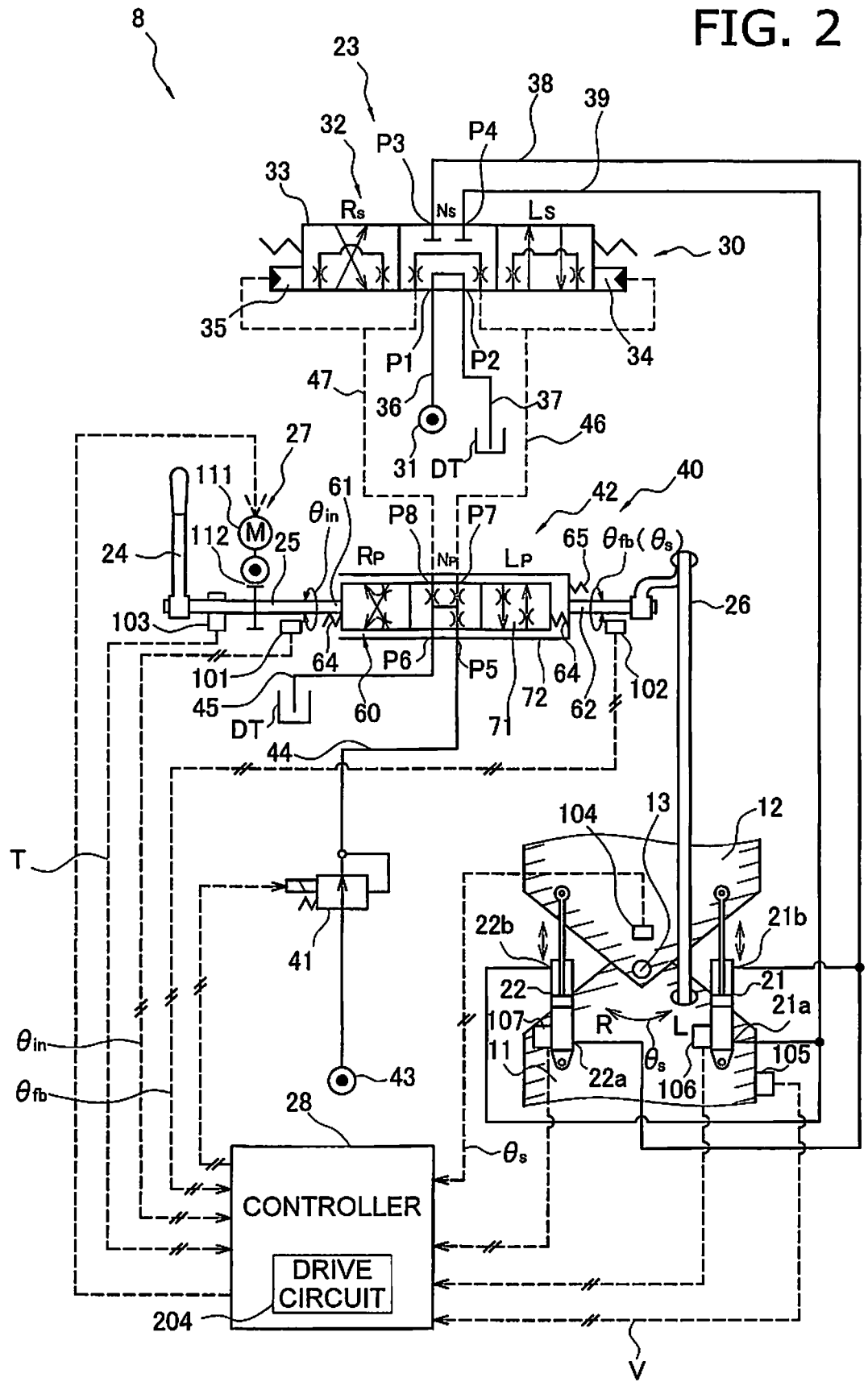
FIG. 2 is a hydraulic circuit diagram showing the configuration of a steering operation device of the wheel loader in FIG. 1.

FIG. 2 is a hydraulic circuit diagram of the configuration of the steering operation device 8. The steering operation device 8 in this embodiment mainly has a pair of steering cylinders 21 and 22, a steering hydraulic circuit 23, a joystick lever 24, a link 25, a linking mechanism 26, a force imparting component 27, and a controller 28.

1-2-1. Steering Cylinders

The steering cylinders 21 and 22 are driven hydraulically. The steering cylinders 21 and 22 are disposed side by side on the left and right sides in the vehicle width direction, flanking a linking shaft 13. The steering cylinder 21 is disposed on the left side of the linking shaft 13 (see FIG. 1). The steering cylinder 22 is disposed on the right side of the linking shaft 13. The steering cylinders 21 and 22 are attached at one end to the front frame 11, and at the other end to the rear frame 12.

The steering cylinder 21 is provided with an extension port 21a and a contraction port 21b, and the steering cylinder 22 is provided with an extension port 22a and a contraction port 22b.

When fluid is supplied to the extension port 21a of the steering cylinder 21 and the contraction port 22b of the steering cylinder 22 and fluid is discharged from the contraction port 21b of the steering cylinder 21 and the extension port 22a of the steering cylinder 22, the steering cylinder 21 extends and the steering cylinder 22 contracts. As a result, the steering angle θs changes and the vehicle turns to the right. When fluid is supplied to the contraction port 21b of the steering cylinder 21 and the extension port 22a of the steering cylinder 22 and fluid is discharged from the extension port 21a of the steering cylinder 21 and the contraction port 22b of the steering cylinder 22, the steering cylinder 21 contracts and the steering cylinder 22 extends. As a result, the steering angle θs changes and the vehicle turns to the left.

A steering angle sensor 104 for detecting a steering angle θs is provided near the linking shaft 13 disposed arranged between the steering cylinders 21 and 22. The steering angle sensor 104 is constituted by a potentiometer, for example, and the sensed steering angle θs is sent to the controller 28 as a sensing signal.

The steering cylinder 21 is provided with a cylinder stroke sensor 106 for detecting the stroke of the cylinder, and the steering cylinder 22 is provided with a cylinder stroke sensor 107 for detecting the stroke of the cylinder. Sensing values from these cylinder stroke sensors 106 and 107 may be sent to the controller 28 to find the steering angle θs.

1-2-2. Steering Hydraulic Circuit

The steering hydraulic circuit 23 is a hydraulic circuit for adjusting the flow of fluid supplied to the steering cylinders 21 and 22. The steering hydraulic circuit 23 has a main hydraulic circuit 30 and a pilot hydraulic circuit 40.

(a) Main Hydraulic Path

The main hydraulic circuit 30 is a circuit that supplies fluid from a main hydraulic pressure source 31 to the steering cylinders 21 and 22, and has a steering valve 32. The main hydraulic pressure source 31 is made up of a hydraulic pump, a relief valve, and the like.

The steering valve 32 is a flow control valve that adjusts the flow of the fluid supplied to the steering cylinders 21 and 22 according to the inputted pilot pressure. The steering valve 32 has a main pump port P1, a main drain port P2, a first steering port P3, and a second steering port P4. The main pump port P1 is connected to the main hydraulic pressure source 31 via a main hydraulic line 36. The main drain port P2 is connected to a drain tank DT that collects fluid via the main drain line 37. The first steering port P3 is connected to the contraction port 21b of the steering cylinder 21 and the extension port 22a of the steering cylinder 22 via a first steering line 38. The second steering port P4 is connected to the extension port 21a of the steering cylinder 21 and the contraction port 22b of the steering cylinder 22 via a second steering line 39.

Also, the steering valve 32 has a valve body 33 that can move between a neutral position Ns, a left steering position Ls, and a right steering position Rs. When the valve body 33 is in the neutral position Ns, the main pump port P1 communicates with the main drain port P2. In this case, the first steering port P3 and the second steering port P4 are not in communication. When the valve body 33 is in the left steering position Ls, the main pump port P1 communicates with the first steering port P3, and the main drain port P2 communicates with the second steering port P4. When the valve body 33 is in the right steering position Rs, the main pump port P1 communicates with the second steering port P4, and the main drain port P2 communicates with the first steering port P3.

The steering valve 32 has a first pilot chamber 34 and a second pilot chamber 35. In a state in which no pilot pressure is supplied to the first pilot chamber 34 or the second pilot chamber 35, and the same pilot pressure is supplied to the first pilot chamber 34 and the second pilot chamber 35, the valve body 33 is in the neutral position Ns. In a state in which the pilot pressure is supplied only to the first pilot chamber 34, the valve body 33 is located in the left steering position Ls. In a state in which the pilot pressure is supplied only to the second pilot chamber 35, the valve body 33 is located in the right steering position Rs. When the valve body 33 is located in the left steering position Ls and the right steering position Rs, the steering valve 32 changes the opening surface area through which the fluid from the main hydraulic pressure source 31 passes according to the supplied pilot pressure. Consequently, the steering valve 32 controls the flow of fluid supplied to the steering cylinder 21 or the steering cylinder 22 according to the pilot pressure.

(b) Pilot Hydraulic Circuit

The pilot hydraulic circuit 40 is a circuit for supplying the fluid from the pilot hydraulic pressure source 43 to the first pilot chamber 34 and the second pilot chamber 35 of the steering valve 32.

The pilot hydraulic circuit 40 has a variable pressure reducer 41 and a pilot valve 42.

(i) Variable Pressure Reducer

The variable pressure reducer 41 reduces and adjusts the hydraulic pressure sent from the pilot hydraulic pressure source 43 to the pilot valve 42. The variable pressure reducer 41 incorporates an electromagnetic pressure reducing valve, and receives a command signal from the controller 28 to control the hydraulic pressure.

(ii) Pilot Valve

The pilot valve 42 is a rotary valve that adjusts the pilot pressure inputted from the pilot hydraulic pressure source 43 to the steering valve 32.

Overview of Pilot Valve Configuration

The rotary pilot valve 42 has a pilot pump port P5, a pilot drain port P6, a first pilot port P7, and a second pilot port P8. The pilot pump port P5 is connected to the variable pressure reducer 41 via a pilot hydraulic line 44, and the variable pressure reducer 41 is connected to the pilot hydraulic pressure source 43. The pilot drain port P6 is connected to the drain tank DT for recovering fluid via a pilot drain line 45. The first pilot port P7 is connected to the first pilot chamber 34 of the steering valve 32 via a first pilot line 46. The second pilot port P8 is connected to the second pilot chamber 35 of the steering valve 32 via a second pilot line 47.

The pilot valve 42 has a valve body component 60 that includes an operation spool 71 and an operation sleeve 72. With the operation sleeve 72 as a reference, the operation spool 71 can move between a neutral position Np, a left pilot position Lp, and a right pilot position Rp.

When the operation spool 71 is in the neutral position Np with respect to the operation sleeve 72, the pilot pump port P5, the pilot drain port P6, the first pilot port P7, and the second pilot port P8 communicate with each other. When the operation spool 71 in the left pilot position Lp with respect to the operation sleeve 72, the pilot pump port P5 communicates with the first pilot port P7, and the pilot drain port P6 communicates with the second pilot port P8. Also, when the operation spool 71 is in the right pilot position Rp with respect to the operation sleeve 72, the pilot pump port P5 communicates with the second pilot port P8, and the pilot drain port P6 communicates with the first pilot port P7.

Figure 3:
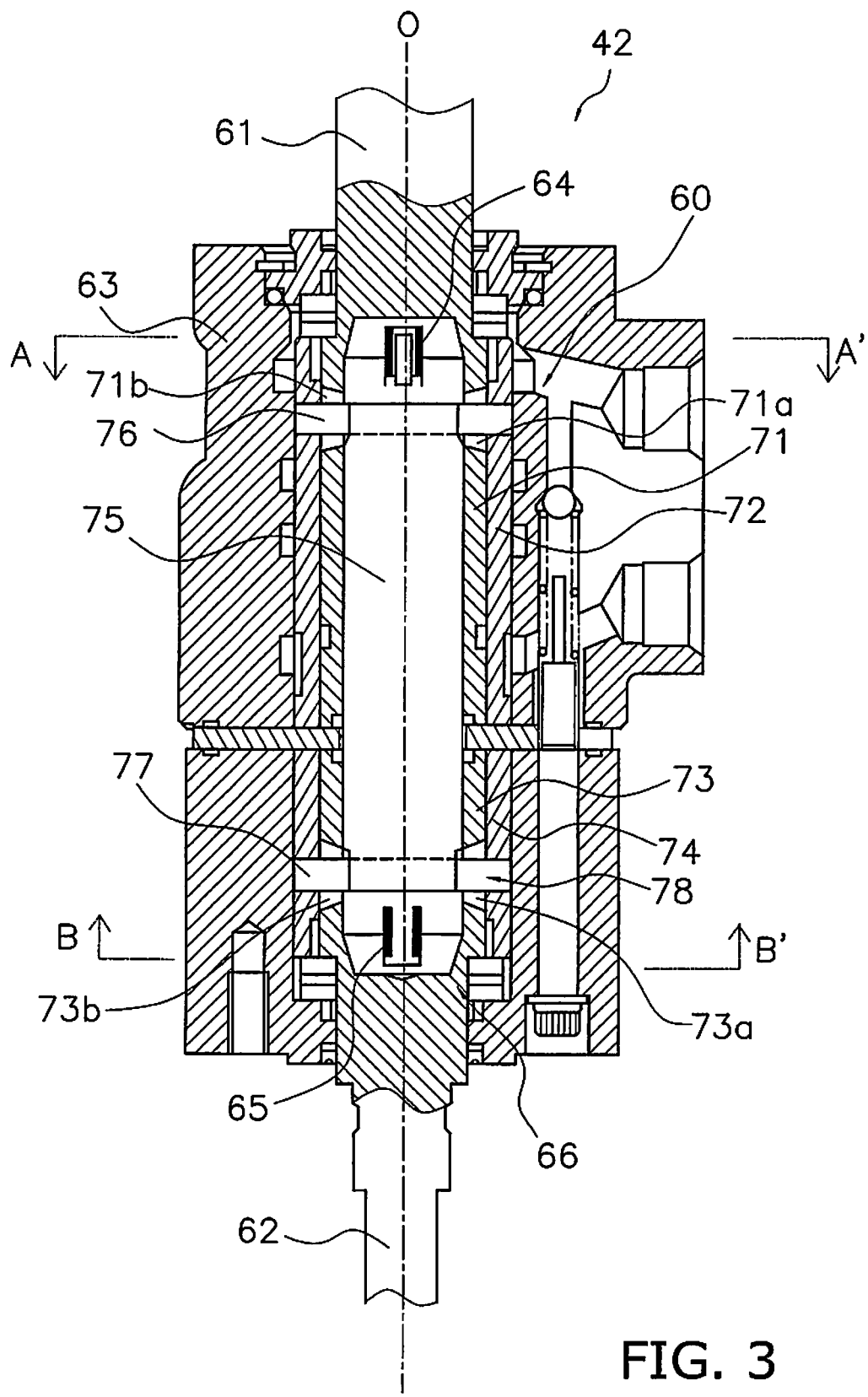
FIG. 3 is a cross section of the configuration of the pilot valve in FIG. 2.

FIG. 3 is a cross section of the configuration of the pilot valve 42.

The pilot valve 42 mainly has the valve body component 60, an operation input shaft 61, a feedback input shaft 62, a housing 63, a first spring 64, a second spring 65, and a feedback component 66.

Operation Input Shaft

The operation input shaft 61 is provided so as to be rotatable around its center axis O, and is inserted into the housing 63. The operation input shaft 61 is linked to the joystick lever 24 (discussed below) via the link 25. The operation input shaft 61 rotates at the same rotational angle as the rotational angle θin to the left and right of the joystick lever 24.

Feedback Input Shaft

The feedback input shaft 62 is disposed coaxially with the operation input shaft 61, and is provided so as to be rotatable around the center axis O. The feedback input shaft 62 is inserted into the housing 63 so as to be opposite the operation input shaft 61. The feedback input shaft 62 is linked to the front frame 11 via a linking mechanism 26 (discussed below) and rotates at the same rotational angle as the steering angle θs of the front frame 11 with respect to the rear frame 12.

Housing

A substantially cylindrical space is formed in the housing 63, and the operation input shaft 61 and the feedback input shaft 62 are inserted as mentioned above. The housing 63 accommodates the valve body component 60 and the feedback component 66, and the pilot pump port P5, the pilot drain port P6, the first pilot port P7, and the second pilot port P8 are formed.

Valve Body Component

The valve body component 60 has the operation spool 71 and the operation sleeve 72, and moves between the neutral position Np, the left pilot position Lp, and the right pilot position Rp when the operation spool 71 rotates with respect to the operation sleeve 72.

The operation spool 71 is substantially cylindrical in shape and disposed coaxially with the operation input shaft 61, and is connected to the operation input shaft 61. The joystick lever 24 is connected to the operation input shaft 61 via the link 25 (discussed below). When the operator operates the joystick lever 24 to the right side by the rotational angle θin, the operation input shaft 61 and the operation spool 71 also rotate to the right around the center axis O by the rotational angle θin. Slits 71a and 71b are formed in the operation spool 71 near the operation input shaft 61 along the peripheral direction at two positions opposite each other so as to sandwich the center axis O in between.

The operation sleeve 72 has a substantially cylindrical shape and is disposed on the outside of the operation spool 71 and inside the housing 63 so as to be rotatable with respect to the operation spool 71 and the housing 63.

In this Specification, the terms right rotation and left rotation indicate the rotation direction when viewed from above.

First Spring

The first spring 64 is inserted between the operation spool 71 and the operation sleeve 72, which are rotatable with respect to each other, and generates a counterforce corresponding to the difference in rotational angle between the two.

Figure 4A:
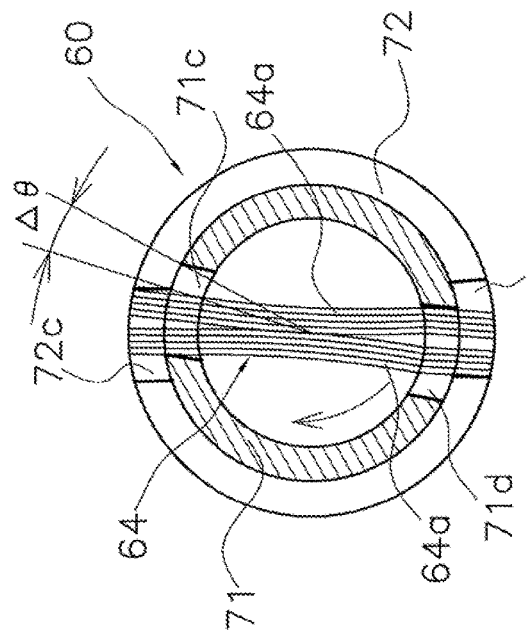
FIGS. 4A and 4B are cross sections along the AA' line in FIG. 3, and FIGS. 4C and 4D are cross sections along the BB' line in FIG. 3.

FIG. 4A is a cross section along the AA' line perpendicular to the center axis O. As shown in FIG. 4A, rectangular holes 71c and 71d are provided to the operation spool 71 on diametrically opposed walls. Rectangular grooves 72c and 72d are formed in the diametrically opposed walls at the end of the operation sleeve 72 on the operation input shaft 61 side. The first spring 64 is formed by two leaf spring units 64a in which a plurality of convex leaf springs are stacked. The two leaf spring units 64a are disposed so that their convex parts are opposite each other so as to form an X shape as in FIG. 4A. The two leaf spring units 64a go through the holes 71c and 71d in the operation spool 71, and both ends thereof go into the grooves 72c and 72d of the operation sleeve 72. The operation spool 71 and the operation sleeve 72 are thus linked by the first spring 64.

As shown in FIG. 4A, a state in which the positions of the hole 71c and the groove 72c in the peripheral direction substantially coincide, and the positions of the hole 71d and the groove 72d in the peripheral direction substantially coincide, is a state in which the valve body component 60 is in the neutral position Np.

Figure 4C:
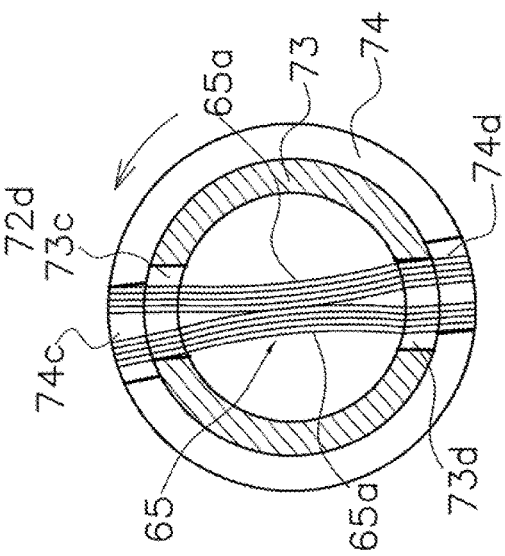
Figure 4B:
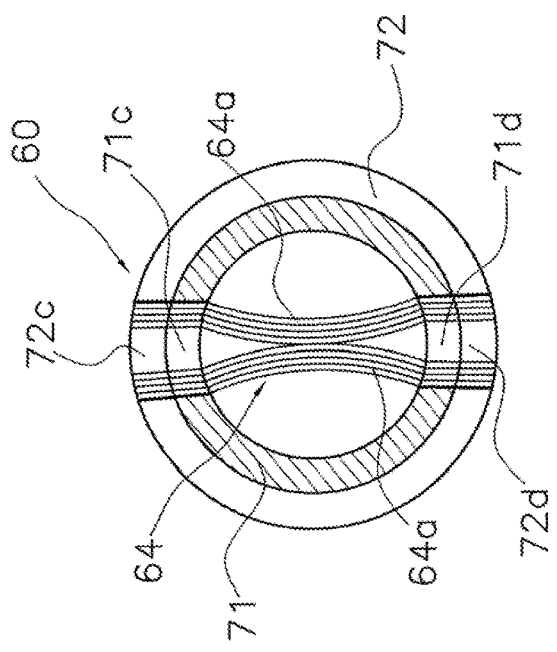

Also, when the joystick lever 24 is operated, the operation spool 71 rotates with respect to the operation sleeve 72 as shown in FIG. 4B, and the operation spool 71 moves with respect to the operation sleeve 72 to the left pilot position Lp or the right pilot position Rp. When the joystick lever 24 is rotated to the right, the operation spool 71 rotates to the right with respect to the operation sleeve 72 and moves to the right pilot position Rp. When the joystick lever 24 is rotated to the left, the operation spool 71 rotates to the left with respect to the operation sleeve 72 and moves to the left pilot position Lp.

In this movement, since the operator moves the joystick lever 24 against the spring force of the first spring 64, a lever counterforce is generated in the joystick lever 24. In other words, the first spring 64 biases the operation spool 71 to the neutral position Np with respect to the operation sleeve 72.

Feedback Component

Meanwhile, the feedback component 66 feeds back the steering angle θs of the front frame 11 with respect to the rear frame 12 to the valve body component 60. The feedback component 66 mainly has a feedback spool 73, a feedback sleeve 74, a drive shaft 75, a first center pin 76, and a restrictor 78.

The drive shaft 75 is disposed between the operation input shaft 61 and the feedback input shaft 62, coaxially with the operation input shaft 61 and the feedback input shaft 62 (center axis O). The drive shaft 75 is disposed inside the operation spool 71. The first center pin 76 is disposed perpendicular to the center axis O at the end of the drive shaft 75 on the operation input shaft 61 side. Both ends of the first center pin 76 go through the slits 71a and 71b and are fixed to the operation sleeve 72. As will be described in detail below, the first center pin 76 and the slits 71a and 71b restrict the rotational angle of the operation spool 71 with respect to the operation sleeve 72 to an angle within a predetermined range. Since the first center pin 76 is fixed to the operation sleeve 72 and the drive shaft 75, the operation sleeve 72 that is integrated with the drive shaft 75 also rotates when the drive shaft 75 is rotated.

The feedback spool 73 has a substantially cylindrical shape and is disposed coaxially with the feedback input shaft 62, and is linked to the feedback input shaft 62. Slits 73a and 73b are formed near the feedback input shaft 62 of the feedback spool 73 along the peripheral direction at two locations that are opposite each other and sandwich the central axis O in between. The drive shaft 75 is disposed inside the feedback spool 73. The feedback input shaft 62 is linked to the front frame 11 via the linking mechanism 26 (discussed below), and when the front frame 11 rotates to right by the steering angle θs with respect to the rear frame 12, the feedback input shaft 62 and the feedback spool 73 also rotate to the right by the same rotational angle θs as the steering angle θs.

The feedback sleeve 74 is substantially cylindrical in shape, and is disposed outside of the feedback spool 73 and inside the housing 63, rotatably with respect to the feedback spool 73 and the housing 63.

The restrictor 78 restricts the rotation of the feedback sleeve 74 with respect to the feedback spool 73 to an angle within a predetermined range. The restrictor 78 is made up of a second center pin 77 and walls 73ae and 73be (discussed below; see FIG. 7) at both ends in the peripheral direction of the slits 73a and 73b.

The second center pin 77 is disposed perpendicular to the center axis O, at the end of the drive shaft 75 on the feedback input shaft 62 side. Both ends of the second center pin 77 are fixed to the feedback sleeve 74 through the slits 73a and 73b. The second center pin 77 and the slits 73a and 73b restrict the rotation of the feedback sleeve 74 with respect to the feedback spool 73 to an angle within a predetermined range. Also, since the second center pin 77 is fixed to the feedback sleeve 74 and the drive shaft 75, when the feedback sleeve 74 rotates, the drive shaft 75 that is integrated with the feedback sleeve 74 also rotates. The rotation of the drive shaft 75 causes the operation sleeve 72 that is fixed to the drive shaft 75 by the first center pin 76 to rotate.

Second Spring

The second spring 65 is inserted between the feedback spool 73 and the feedback sleeve 74, which are able to rotate relative to each other, and generates a counterforce corresponding to the rotational difference between the two. FIG. 4C is cross section along the BB' line in FIG. 3.

As shown in FIG. 4C, square holes 73c and 73d are provided to the diametrically opposed walls of the feedback spool 73.

Also, rectangular grooves 74c and 74d are formed in the diametrically opposed walls at the end of the feedback sleeve 74 on the feedback input shaft 62 side. The second spring 65 is formed from two leaf spring units 65a in which a plurality of convex leaf springs are stacked. The two leaf spring units 65a are disposed so that their convex parts are opposite each other so as to form an X shape as in FIG. 4C. The two leaf spring units 65a go through the holes 73c and 73d in the feedback spool 73, and both ends thereof go into the grooves 74c and 74d of the feedback sleeve 74. The feedback spool 73 and the feedback sleeve 74 are thus linked by the second spring 65. In the state in FIG. 4C, the hole 73c and the groove 74c coincide in the peripheral direction, and the hole 73d and the groove 74d coincide in the peripheral direction. The feedback sleeve 74 is biased by the second spring 65 so that the positions of the grooves 74c and 74d in the peripheral direction match the positions of the holes 73c and 73d of the feedback spool 73 in the peripheral direction.

The first spring 64 bends until the operation spool 71 is restricted with respect to the operation sleeve 72, but the second spring 65 is set so that it begins to bend when subjected to a force that is greater than the counterforce produced by the first spring 64 until the operation spool 71 is restricted.

Figure 4D:
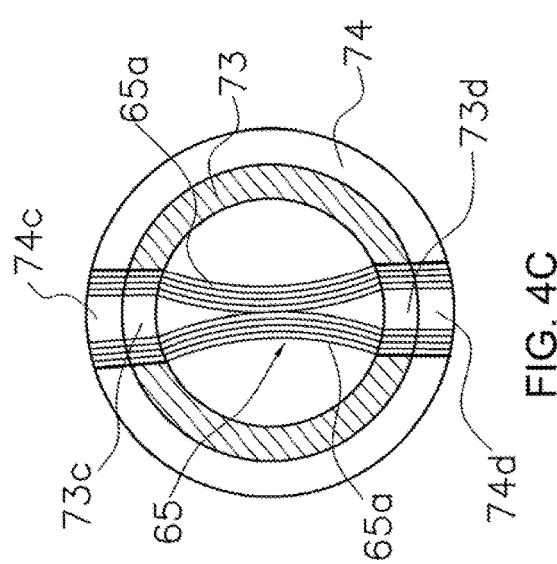

As described later in below through reference to FIG. 7, when the operation spool 71 rotates with respect to the operation sleeve 72 up to the angle at which the operation spool 71 is restricted, and the joystick lever 24 is then operated, as shown in FIG. 4D, the second spring 65 bends and the feedback sleeve 74 rotates with respect to the feedback spool 73. FIG. 4D is a cross section along the BB' line in FIG. 3, and since the view is from below, the arrow indicating the rotational direction is reversed from that in FIG. 4B.

That is, when the joystick lever 24 is operated past the angle at which the operation spool 71 is restricted with respect to the operation sleeve 72, the operator must operate the joystick lever 24 against the biasing force of the second spring 65.

With the above configuration of the feedback unit 66, when the feedback input shaft 62 rotates in accordance with a change in the steering angle, the feedback spool 73 rotates, and the feedback sleeve 74 that is linked to the feedback spool 73 via the second spring 65 also rotates. Then, the operation sleeve 72, which is fixed to the feedback sleeve 74 via the second center pin 77, the drive shaft 75, and the first center pin 76, also rotates, which produces a change in the difference in rotational angle between the operation spool 71 and the operation sleeve 72 and changes the pilot pressure.

That is, with the pilot valve 42, the position of the operating spool 71 with respect to the operation sleeve 72 moves to the neutral position Np, the left pilot position Lp, or the right pilot positions Rp, according to the difference α between the rotational angle θin of the operation input shaft 61 and the rotational angle θfb (matches the steering angle θs) of the feedback input shaft 62. When the rotational angle difference α is zero, the operation spool 71 is in the neutral position Np with respect to the operation sleeve 72. Also, when the operation spool 71 is in the left pilot position Lp or the right pilot positions Rp with respect to the operation sleeve 72, the pilot valve 42 changes the opening surface area through which fluid from the pilot hydraulic source 43 passes, according to the rotational angle difference α. Consequently, the pilot pressure sent from the pilot valve 42 to the steering valve 32 is adjusted according to the rotational angle difference α.

A first rotational angle sensor 101, constituted by a rotary sensor, for example, is provided to the input shaft 61. The first rotational angle sensor 101 senses the rotational angle θin of the operation input shaft 61. A second rotational angle sensor 102, constituted by a rotary sensor, for example, is provided to the feedback input shaft 62. The second rotational angle sensor 102 senses the rotational angle θfb (=θs) of the feedback input shaft 62. The rotational angles θin and θfb sensed by the first rotational angle sensor 101 and the second rotational angle sensor 102 are sent as sensing signals to the controller 28.

As discussed above, the steering angle θs at the linking shaft 13 is also sensed by a steering angle sensor 104, but since the rotational angle θfb of the feedback input shaft 62 matches the steering angle θs, the steering angle sensor 104 may be omitted.

1-2-3. Joystick Lever, Link

Figure 5:
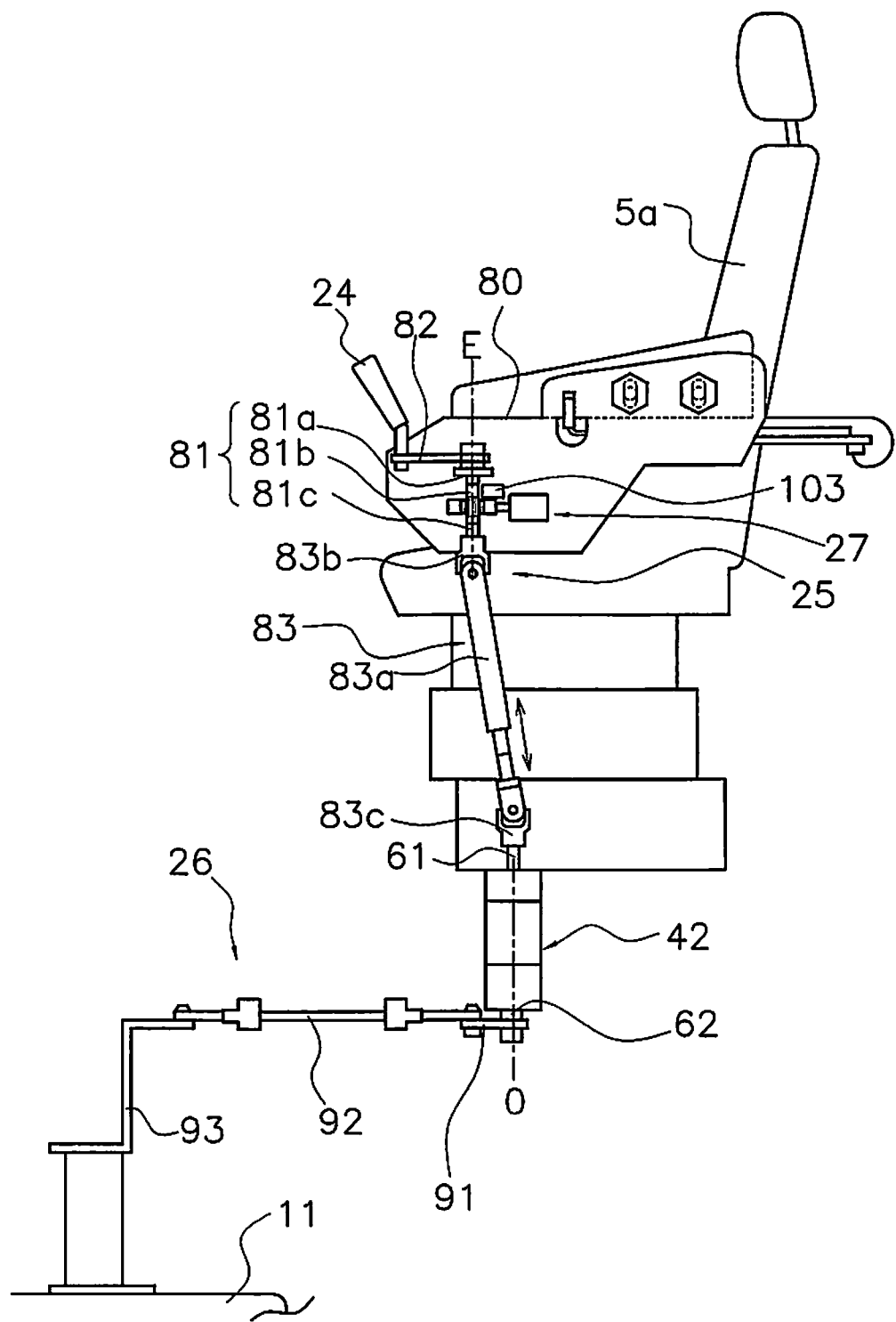
FIG. 5 is a side view of the link and linking mechanism in FIG. 2.

FIG. 5 is a side view of the configuration inside the cab 5. An operator's seat 5a in which the operator sits is provided inside the cab 5. A steering box 80 is disposed on the left side in the vehicle width direction of the operator's seat 5a.

The joystick lever 24 is disposed protruding obliquely upward toward the front from the steering box 80.

The link 25 links the joystick lever 24 and the pilot valve 42. The link 25 mainly has a steering operation shaft 81, a linking bar 82, and a universal joint 83.

The steering operation shaft 81 is disposed vertically, and is supported rotatably around its center axis E by the steering box 80. The linking bar 82 is disposed inside the steering box 80, and links the joystick lever 24 to the steering operation shaft 81.

More precisely, the steering operation shaft 81 is made up of a lever-side shaft 81a, an input shaft 81b, and a valve-side shaft 81c that are connected in that order (see FIG. 8 discussed below). That is, one end of the lever-side shaft 81a is linked to the linking bar 82, and the other end of the lever-side shaft 81a is linked to one end of the input shaft 81b. The other end of the input shaft 81b is connected to one end of the valve-side shaft 81c, and the other end of the valve-side shaft 81c is connected to the universal joint 83. An assist force or a counterforce from the force imparting component 27 (discussed below) is inputted to the input shaft 81b.

The universal joint 83 links the steering operation shaft 81 to the operation input shaft 61 of the pilot valve 42 disposed near the operator's seat 5a. The universal joint 83 has a telescoping center portion 83a and joint portions 83b and 83c disposed at both ends of the center portion 83a. The joint portion 83b is linked to the steering operation shaft 81. The joint portion 83c is linked to the operation input shaft 61.

Figure 6:
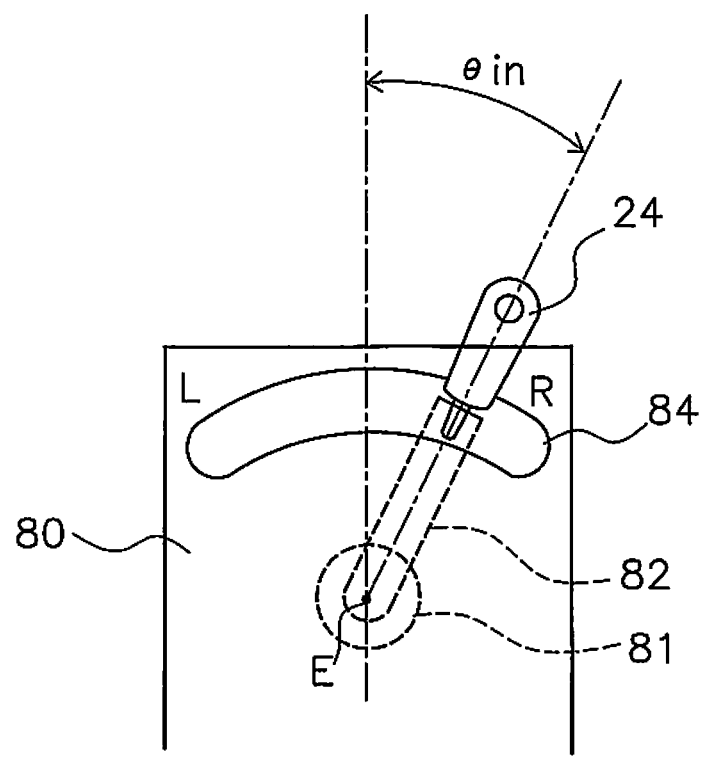
FIG. 6 shows joystick lever in FIG. 5 as seen from above.

FIG. 6 is a plan view of the area near the joystick lever 24 as seen from above. As shown in FIG. 6, the joystick lever 24 is formed protruding obliquely upward from an arc-shaped hole 84 formed in the upper face of the steering box 80. The joystick lever 24 is capable of turning horizontally around the steering operation shaft 81 (more precisely, the center axis E). Also, the edge of the right end of the hole 84 of the steering box 80 is marked with an R, and the edge of the left end is marked with an L.

For example, as shown in FIG. 6, when the operator rotates joystick lever 24 by the rotational angle θin to the right from the center position, the steering operation shaft 81 also rotates to the right by the rotational angle θin. This rotation of the steering operation shaft 81 by the rotational angle θin is transmitted through the universal joint 83 to the operation input shaft 61, and the operation input shaft 61 also rotates to the right by the rotational angle θin. The same applies when the joystick lever 24 is rotated to the left.

1-2-4. Linking Mechanism

The linking mechanism 26 has a follow-up lever 91, a follow-up link 92, and a bracket 93. The follow-up link 92 is fixed to the feedback input shaft 62 of the pilot valve 42. The bracket 93 is fixed to the front frame 11. The follow-up link 92 is linked to the follow-up lever 91 and the bracket 93.

This linking mechanism 26 links the front frame 11 to the pilot valve 42 disposed on the rear frame 12.

The linking mechanism 26 makes the steering angle θs of the front frame 11 with respect to the rear frame 12 be the same as the rotational angle θfb of the feedback input shaft 62.

That is, when the front frame 11 rotates to the right side around the linking shaft 13 with respect to the rear frame 12 by the steering angle θs, the feedback input shaft 62 also rotates right by the rotational angle θs via the linking mechanism 26, and when the front frame 11 rotates to the left side by the steering angle θs, the feedback input shaft 62 also rotates left by the rotational angle θs via the linking mechanism 26.

1-2-5. Lever Counterforce

The lever counterforce produced by the first spring 64 and the second spring 65 when the joystick lever 24 is operated will now be described.

FIG. 7A is a simplified diagram of the pilot valve 42. FIG. 7B is a graph of the relation between lever counterforce and the body-lever angular deviation. The body-lever angular deviation α is the difference (θin−θfb) between the rotational angle θin of the joystick lever 24 and the steering angle θs of the front frame 11 with respect to the rear frame 12. FIG. 7C is a cross section along the CC', DD', EE', and FF' lines in FIG. 7A when the angular deviation α is zero. FIG. 7D is a cross section along the CC', DD', EE', and FF' lines in FIG. 7A when the angular deviation α is θ2, and FIG. 7E is a cross section along the CC', DD', EE', and FF' lines in FIG. 7A when the angular deviation α is θ3. As shown in FIG. 7A, the cross sections along the CC', DD', EE', and FF' lines are all as seen from above. In FIG. 7B, play in the joystick lever 24 is not taken into account in order to make the illustration easier to understand.

When the operator rotates the joystick lever 24 by the rotational angle θin from the center position, the operation input shaft 61 also rotates by the rotational angle θin. Meanwhile, since the response of the steering cylinders 21 and 22 is delayed, the steering angle θs increases gradually in accordance with the rotational angle θin. The rotational angle θin of the joystick lever 24 represents the target steering angle, while the steering angle θs indicates the actual steering angle. The feedback input shaft 62 also rotates by the same rotational angle θs in response to a change in the steering angle θs. The feedback spool 73 also rotates together with the feedback input shaft 62, and this rotation causes the feedback sleeve 74 linked via the second spring 65 to rotate as well.

Since the feedback sleeve 74 and the operation sleeve 72 are integrated with the first center pin 76, the second center pin 77, and the drive shaft 75, rotation of the feedback sleeve 74 causes the operation sleeve 72 to rotate as well.

Specifically, the difference between the rotational angle of the operation spool 71 and the rotational angle of the operation sleeve 72 corresponds to the angular deviation α (see FIG. 4B).

Since the first spring 64 biases the operation spool 71 to the neutral position Np with respect to the operation sleeve 72, the joystick lever 24 must be operated against the biasing force of the first spring 64 in order to increase the angular deviation α.

The first spring 64 has the spring property S1 shown in FIG. 7B. With the spring property S1 of the first spring 64, the joystick lever 24 must be operated with a force at or above an initial counterforce F1 (the force required to begin to bend the first spring 64) in order to rotate the operation input shaft 61. Also, with the spring property S1 of the first spring 64, the lever counterforce increases in proportion to the angular deviation α. That is, as the angular deviation α increases, the force required to operate the joystick lever 24 increases.

As shown in FIG. 7C, in the neutral position Np where the angular deviation α is zero, the first center pin 76 is disposed in the center of the slits 71*a* and 71*b* of the operation spool 71. The second center pin 77 is disposed in the center of the slits 73*a* and 73*b* of the feedback spool 73.

The joystick lever 24 is then rotated to the right side, for example, to increase the angular deviation α, and when the angular deviation α reaches the angle θ2, as shown in FIG. 7D, the first center pin 76 hits the wall 71*ae* formed in the peripheral direction of the slit 71*a*, and the wall 71*be* formed in the peripheral direction of the slit 71*b*. At this point the second center pin 77 is disposed in the center of the slits 73*a* and 73*b* of the feedback spool 73. This is because if we let F2 be the counterforce produced by the first spring 64 when the angular deviation α is the angle θ2, the initial counterforce (the force needed to start bending the second spring 65) is set to F2 as indicated by the spring property S2 of the second spring 65. The initial counterforce of the second spring 65 may be set higher than F2, or may be greater than or equal to F2.

Furthermore, the operator must operate the joystick lever 24 against the counterforce of the second spring 65 to rotate it to the right side. That is, when the joystick lever 24 is further rotated to the right side, since the first center pin 76 is hitting the walls 71*ae* and 71*be*, it is necessary to rotate the operation sleeve 72 if an attempt is made to rotate the operation spool 71. Also, as discussed above, the operation sleeve 72 is integrated with the feedback sleeve 74, and the feedback spool 73 is connected to the feedback input shaft 62. Therefore, when the joystick lever 24 is further rotated to the right side, the operator operates against the counterforce of the second spring 65, as shown in FIG. 4D. When the angular deviation α reaches θ3, as shown in FIG. 7E, the second center pin 77 hits the wall 73*ae* formed in the peripheral direction of the slit 73*a* and the wall 73*be* formed in the peripheral direction of the slit 73*b*. Thus, the second center pin 77 is able to rotate by an angle (θ3−θ2). That is, the pilot valve 42 is configured so that the angular deviation α will not exceed the angle θ3. Therefore, as shown in FIG. 7B, the lever counterforce goes straight up at the angle θ3. If the second center pin 77 strikes the walls 73*ae* and 73*be* with sufficient energy, a sharp rebound will be generated to put a burden on the operator's wrist. This angle θ3 is also referred to as the catch-up angle.

FIG. 7B illustrates an example in which the joystick lever 24 is rotated to the right side, but the same applies when the joystick lever 24 is rotated to the left side, in which case the deviation angle α is a negative value (see the two-dot chain line L7 in FIG. 9B (discussed below)). That is, when the deviation angle α reaches −θ2, the first center pin 76 strikes the wall portions 71*ae* and 71*be*, and the second center pin 77 strikes the wall portions 73*ae* and 73*be* at −θ3. The pilot valve 42 is thus configured so that the absolute value of the deviation angle α does not become larger than the angle θ3.

Until the angular deviation α reaches θ2, there will be a difference between the rotational angle of the operation spool 71 and the rotational angle of the operation sleeve 72, but once the angle θ2 is exceeded, there is no longer any difference between the rotational angles of the operation spool 71 and the operation sleeve 72, so the aperture of the pilot valve 42 stays constant. Also, while the aperture of the pilot valve 42 remains constant when the angular deviation α is between the angles θ2 and θ3, the pilot pressure should be varied according to the angular deviation by controlling the variable pressure reducer 41.

1-2-6. Force Imparting Component

Figure 8:
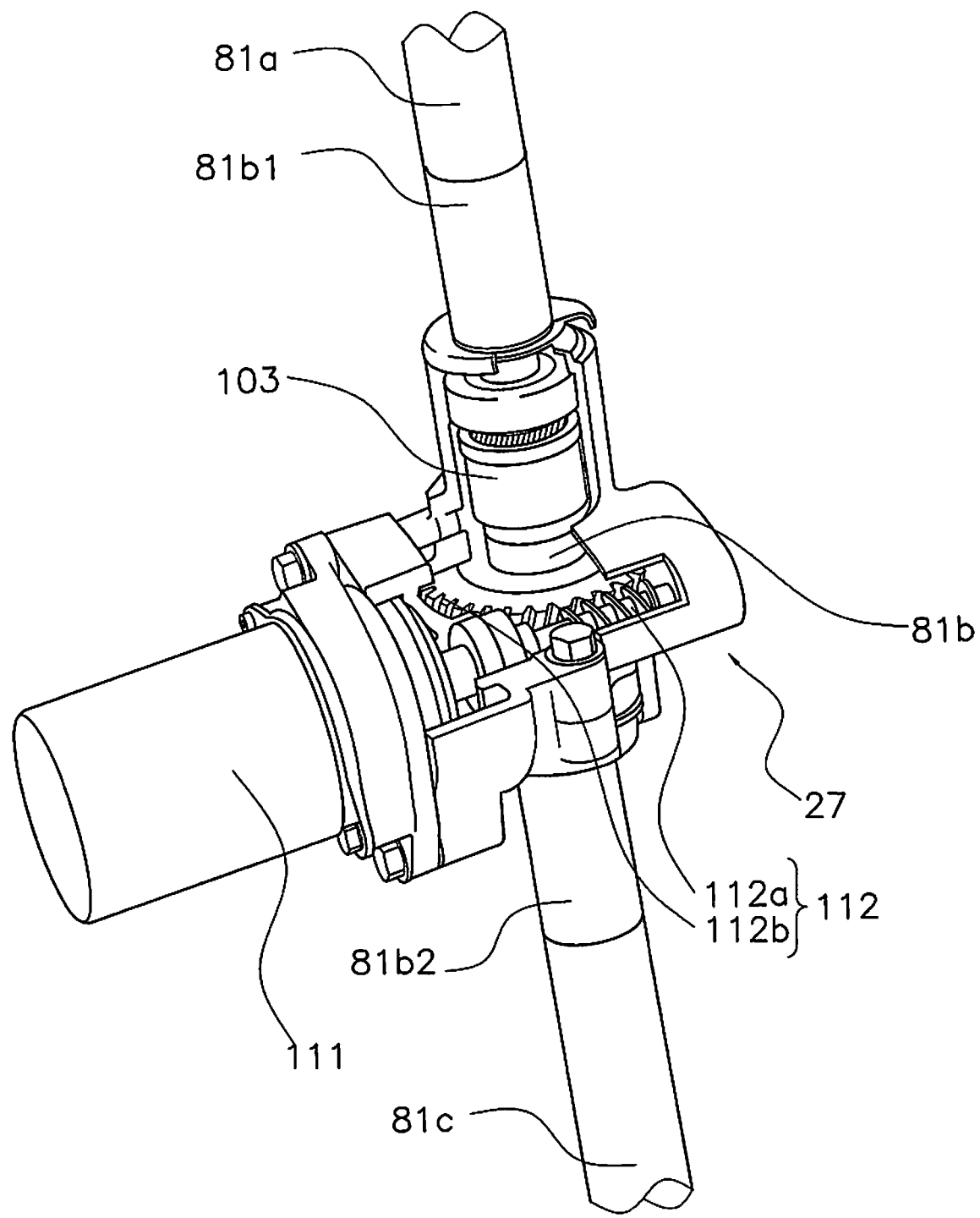
FIG. 8 is an oblique view of the configuration of the force imparting component in FIG. 2.

FIG. 8 is an oblique view of the force imparting component 27. The force imparting component 27 imparts an assist force or counterforce to the operation of the joystick lever 24. The force imparting component 27 has an electric motor 111 and a worm gear 112. The worm gear 112 has a cylindrical worm 112*a* and a worm wheel 112*b*. The worm wheel 112*b* is provided around the above-mentioned input shaft 81*b*, and meshes with the cylindrical worm 112*a*. The output shaft of the electric motor 111 is connected to the cylindrical worm 112*a*, and rotates the cylindrical worm 112a around its center axis. The electric motor 111 is driven on the basis of a command from a drive circuit 204 provided to the controller 28.

The first end 81b1 of the input shaft 81b is connected to the lever-side shaft 81a, and the second end 81b2 is connected to the valve-side shaft 81c.

When the electric motor 111 is driven, the cylindrical worm 112a rotates, this rotation causes the worm wheel 112b to rotate, and rotational force is also produced at the input shaft 81b that is fixed to the worm wheel 112b. Rotational force can be applied for left rotation or right rotation to the input shaft 81b by changing the direction of rotation of the cylindrical worm 112a.

For example, when the joystick lever 24 is rotated to the right, an assist force is imparted to the operation of the joystick lever 24 by applying a force in the right rotation direction to the input shaft 81b. Also, when the joystick lever 24 is rotated to the right, a counterforce is imparted to the operation of the joystick lever 24 by applying a force in the left rotation direction to the input shaft 81b.

A torque sensor 103 is provided to the input shaft 81b. The torque sensor 103 senses the torque generated at the input shaft 81b exerted on the joystick lever 24 by the operator. The torque sensor 103 in this embodiment, for example, senses the torque generated at the input shaft 81b and the rotation direction of the input shaft 81b by sensing the twisting of a torsion bar with a coil, for example. The sensed rotation direction and torque T are outputted to the controller 28 as a steering torque signal.

1-2-7. Controller

The controller 28 has an arithmetic unit such as a CPU, and a storage device such as a RAM or a ROM.

The controller 28 outputs a command signal to the electric motor 111 and the variable pressure reducer 41 over a wire or wirelessly, to control the electric motor 111 and the variable pressure reducer 41.

The rotational angle $\theta in$ of the operation input shaft 61 sensed by the first rotational angle sensor 101, the rotational angle $\theta fb$ (=$\theta s$) of the feedback input shaft 62 sensed by the second rotational angle sensor 102, and the steering angle $\theta s$ sensed by the steering angle sensor 104 are inputted as sensing signals to the controller 28.

The vehicle speed V sensed by a vehicle speed sensor 105 is also inputted as a sensing signal to the controller 28. Further, the torque T sensed by the torque sensor 103 is inputted as a steering torque signal to the controller 28.

The controller 28 controls the variable pressure reducer 41 on the basis of the rotational angle $\theta in$, the rotational angle $\theta fb$ (=$\theta s$), and the vehicle speed V. Consequently, the source pressure of the pilot pressure sent to the pilot valve 42 can be controlled so that there will be no abrupt changes in the flow of fluid to the left and right steering cylinders 21 and 22.

Also, the controller 28 controls the electric motor 111 on the basis of the rotational angle $\theta in$, the rotational angle $\theta fb$ (=$\theta s$), the vehicle speed V, the steering torque signal (including the torque T), and so forth.

Thus, the controller 28 can impart an assist force or counterforce to the operation of the joystick lever 24 by the operator by driving the electric motor 111 on the basis of the value of the torque T.

2. Operation

The steering operation with the wheel loader 1 in this embodiment will now be described.

2-1. Steering Operation

If the joystick lever 24 is in the center position, the operation input shaft 61 is located in a predetermined initial position, and the rotational angle $\theta in$ produced by the operation input shaft 61 is zero. Also, since the steering angle $\theta s$ is zero, the feedback input shaft 62 is also located in a predetermined initial position. In this embodiment, as shown in FIG. 7A, the steering angle $\theta s$ indicates the angle from a state in which the angle along the longitudinal direction with respect to the rear frame 12 is zero. As shown in FIG. 6, the rotational angle $\theta in$ indicates the rotational angle from the center position of the joystick lever 24. Also, in finding the angular deviation, computation may be performed using a positive angle for rotation to the right and a negative angle for rotation to the left, for example.

At this point, the operation spool 71 is located in the neutral position Np shown in FIG. 4A with respect to the operating sleeve 72. In this case, the pilot pressure in the first pilot chamber 34 and in the second pilot chamber 35 of the steering valve 32 is the same, and the valve body 33 of the steering valve 32 is also in the neutral position Ns. Therefore, no fluid is supplied or discharged to or from the left and right steering cylinders 21 and 22, the steering angle $\theta s$ is maintained at zero, and the rotational angle $\theta fb$ (=$\theta s$) of the feedback input shaft 62 is also maintained at zero.

Next, the operator exerts an operation force Fin to rotate the joystick lever 24 to the right side from the center position as shown in FIG. 6. When the operating force Fin exceeds F1 of the first spring 64, the operation input shaft 61 rotates to the right the same as the joystick lever 24, and the rotational angle $\theta in$ of the first operation input shaft 61 is increased. At this point, because of the delay in the response of the left and right steering cylinders 21 and 22, the steering angle $\theta s$ is still at zero, and the rotational angle $\theta fb$ (=$\theta s$) of the feedback input shaft 62 is also zero. Therefore, the angular deviation ($\alpha$=$\theta in$−$\theta s$) between the rotational angle $\theta in$ and the steering angle $\theta s$ increases.

The operation spool 71 rotates to the right with respect to the operation sleeve 72 together with the rotation of the operation input shaft 61. Here, the operation sleeve 72 is integrated with the feedback sleeve 74, and the feedback sleeve 74 is linked to the feedback spool 73 by the second spring 65. The initial counterforce F2 of the second spring 65 is at or above the counterforce of the spring property S1 of the first spring 64 shown in FIG. 7B. Therefore, the operation sleeve 72 does not rotate along with the operating spool 71, and operating the spool 71 rotates to the right with respect to the operation sleeve 72.

Thus, the operating spool 71 rotates to the right with respect to the operation sleeve 72 and moves to the right pilot positions Rp, pilot pressure is supplied to the second pilot port P8, and the pilot pressure is supplied to the second pilot chamber 35.

Thus, the valve body 33 of the steering valve 32 moves to the right steering position Rs, fluid is supplied to the extension port 21a of the steering cylinder 21 and the contraction port 22b of the steering cylinder 22, and fluid is discharged from the contraction port 21b of the steering cylinder 21 and the extension port 22a of the steering cylinder 22. This gradually increases the steering angle $\theta s$, and the front frame 11 is oriented in the right direction with respect to the rear frame 12 (see R in FIG. 2). This change in the steering angle $\theta s$ is transmitted by the linking mechanism 26 to the feedback input shaft 62, and the feedback input shaft 62 rotates at the rotational angle $\theta s$.

When the operator stops the joystick lever 24 at a predetermined rotational angle $\theta 1$, the operation input shaft 61 also stops at the rotational angle $\theta 1$. On the other hand, since the steering angle $\theta s$ is gradually increasing, the rotational angle $\theta s$ of the feedback input shaft 62 also increases. The feedback spool 73 also rotates along with the feedback input shaft 62, and the feedback sleeve 74 linked via the second spring 65 to the feedback spool 73 also rotates. Since the feedback sleeve 74 is integrated with the operation sleeve 72 via the first center pin 76, the second center pin 77, and the drive shaft 75, the operation sleeve 72 also rotates along with the rotation of the feedback sleeve 74. Rotation of the operation sleeve 72 reduces the difference in the rotational angle (deflection angle α) between the operation sleeve 72 and the operation spool 71. When the steering angle θs (the rotational angle θs of the feedback input shaft 62) catches up with the rotational angle θ1 (the rotational angle θin of the operation input shaft 61), the angular deviation α drops to zero. At this point, the operation spool 71 of the pilot valve 42 is located in the neutral position Np with respect to the operation sleeve 72. In this case, the pilot pressure in the first pilot chamber 34 and the second pilot chamber 35 of the steering valve 32 is the same, and the steering valve 32 is also in the neutral position Ns. Therefore, no fluid is supplied or discharged to or from the left and right steering cylinders 21 and 22, and the steering angle θs is maintained at the rotational angle θ1.

When the joystick lever 24 is thus rotated to the right side and stopped at a predetermined rotational angle θ1, the steering angle θs is also maintained at the same rotational angle θ1. This keeps the front frame 11 oriented in the direction of the rotational angle θ1, to the right with respect to the rear frame 12.

When the operator then returns the joystick lever 24 from the right side position to the center position, the operation input shaft 61 similarly rotates, which reduces the rotational angle θin of the operation input shaft 61. At this point, because of the delay in the response of the left and right steering cylinders 21 and 22, the steering angle θs is still the rotational angle θ1. Therefore, the rotational angle difference α (=θin−θs) decreases from zero and becomes negative. Then, the operation spool 71 rotates to the left with respect to the operation sleeve 72 and moves to the left pilot position Lp, and pilot pressure is supplied to the first pilot port P7. Consequently, the valve body 33 of the steering valve 32 moves to the left steering position Ls, fluid is supplied to the contraction port 21b of the steering cylinder 21 and the extension port 22a of the steering cylinder 22, and fluid is discharged from the extension port 21a of the steering cylinder 21 and the contraction port 22b of the steering cylinder 22. This gradually reduces the steering angle θs from the rotational angle θ1. This change in the steering angle θs is transmitted by the linking mechanism 26 to the feedback input shaft 62, and the feedback input shaft 62 rotates at the same change in rotational angle as the change in the steering angle θs.

When the operator stops the joystick lever 24 in its center position, the operation input shaft 61 also stops at its initial position, that is, at a position where the rotational angle θin is zero. Meanwhile, since the steering angle θs is gradually decreasing from the rotational angle θ1, the difference in rotational angle (angular deviation) α decreases gradually. When the steering angle θs reaches zero, the rotational angle θfb (=θs) of the feedback input shaft 62 also reaches zero, and the rotational angle difference α becomes zero. At this point, the operation spool 71 is disposed in the neutral position Np with respect to the operation sleeve 72. In this case, the pilot pressure in the first pilot chamber 34 and the second pilot chamber 35 of the steering valve 32 is the same, and the steering valve 32 is also in the neutral position Ns. Therefore, no fluid is supplied or discharged to or from the left and right steering cylinders 21 and 22, and the steering angle θs goes back to zero and is maintained there. Consequently, the front frame 11 is returned to an orientation along the longitudinal direction with respect to the rear frame 12.

The situation is the same when the joystick lever 24 is rotated to the left side, and will therefore not be described here.

2-2. Control of Force Imparting Component

Next, the control of the force imparting component 27 when the joystick lever 24 is operated as above will be described.

With the wheel loader 1 in this embodiment, the force imparting component 27 is controlled so that the force imparted to the operation of the joystick lever 24 is changed according to the vehicle speed. More precisely, the controller 28 of the wheel loader 1 controls the force imparting component 27 so that the higher is the speed sensed by the vehicle speed sensor 105, the greater is the operating force required to operate the joystick lever 24.

The controller 28 stores assist torque information indicating the imparted assist torque versus the torque inputted by the joystick lever 24 for each vehicle speed, and controls the force imparting component 27 on the basis of this assist torque information.

2-2-1. Assist Torque Information

Figure 9A:
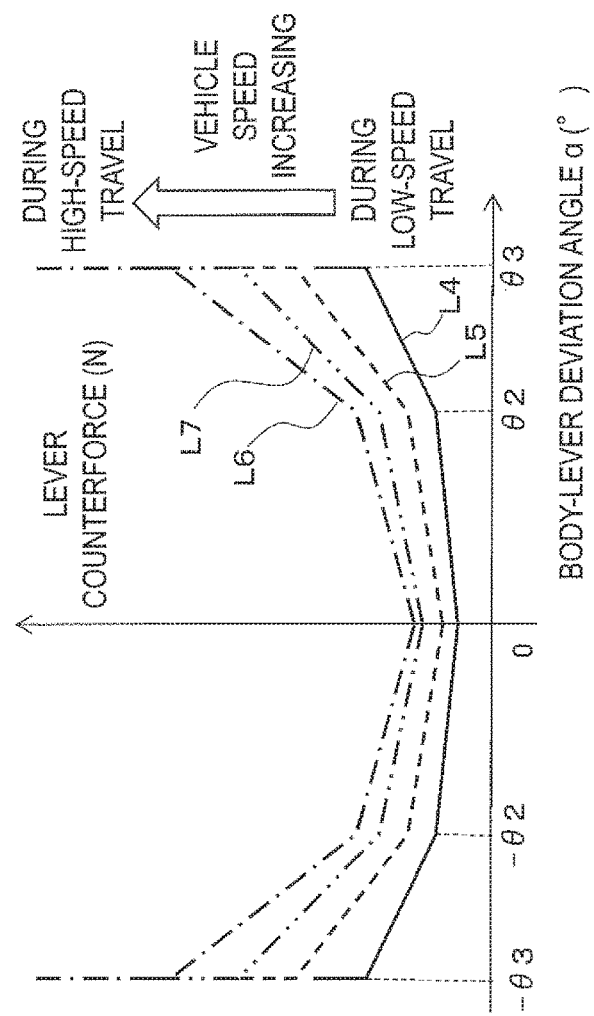
FIG. 9A is a graph of assist force versus lever input torque at three different vehicle speeds in this embodiment.

FIG. 9A is a graph of the assist force (assist force information) for each vehicle speed to be imparted versus the input torque. FIG. 9A shows the imparted assist force (assist force information) at each vehicle speed versus lever input torque, when the vehicle speed is 0 km/h (solid line L1), when the vehicle speed is 25 km/h (dotted line L2), and when the vehicle speed is 40 km/h (one-dot chain line L3).

With the assist force information shown in FIG. 9A, at vehicle speeds of 0 km/h (L1) and 25 km/h (L2), the imparted assist force versus lever input torque is a positive value, and assist force is applied to the operation of the joystick lever 24. That is, when the joystick lever 24 is rotated to the right side, the force imparting component 27 is controlled so as to impart a force to the input shaft 81b in the right rotation direction. When the joystick lever 24 is rotated to the left side, the force imparting component 27 is controlled so as to apply a force to the input shaft 81b in the left rotation direction.

A comparison of when the vehicle speed is 0 km/h (L1) and when the vehicle speed is 25 km/h (L2) shows that the assist force imparted to the lever input torque is greater at 0 km/h than at 25 km/h.

As shown in FIG. 9A, when the vehicle speed is 40 km/h (L3), the assist force imparted to the lever input torque is negative, and a counterforce is applied to the operation of the joystick lever 24.

Specifically, when the joystick lever 24 is rotated to the right side, the force imparting component 27 imparts a force to the input shaft 81b in the left rotation direction, and when the joystick lever 24 is rotated to the left side, the force imparting component 27 imparts a force to the input shaft 81b in the right rotation direction. Consequently, more operating force is required to operate the joystick lever 24.

Since the steering torque signal inputted from the torque sensor 103 includes not only the amount of torque but also information about the rotation direction, the controller 28 recognizes the operation direction of the joystick lever 24 on the basis of information about the rotation direction and rotates the electric motor 111 in the proper direction for each speed.

Figure 9B:
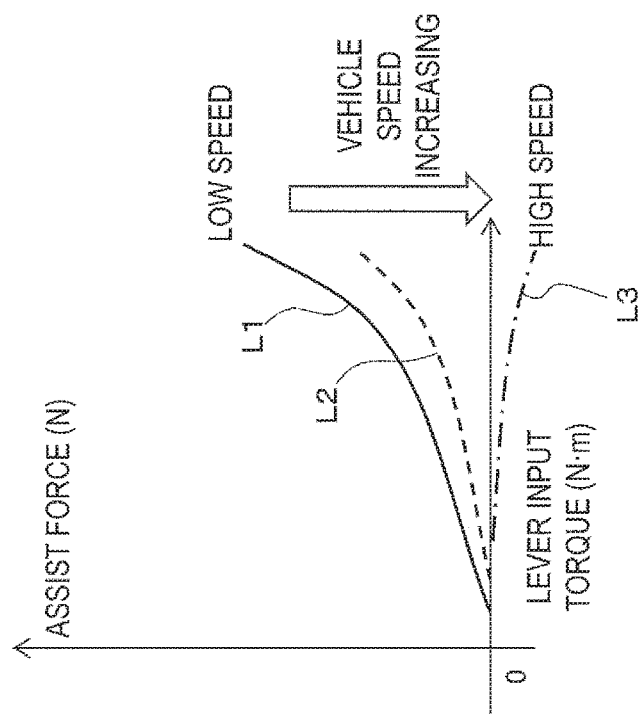
FIG. 9B is a graph of lever counterforce versus body-lever deviation angle when the assist force shown in FIG. 9A is and is not imparted.

FIG. 9B is a graph of the lever counterforce versus the deviation angle α when a force is and is not imparted on the basis of the assist force information shown in FIG. 9A. The solid line L4 indicates the lever counterforce with respect to the body-lever deviation angle at a vehicle speed of 0 km/h, the dotted line L5 indicates the lever counterforce with respect to the body-lever deviation angle at a vehicle speed of 25 km/h, and the one-dot chain line L6 indicates the lever counterforce with respect to the body-lever deviation angle at a vehicle speed of 40 km/h. The two-dot chain line L7 indicates the lever counterforce with respect to the body-lever deviation angle when no force is imparted, and this is the same state as that of the lever counterforce in FIG. 7B. FIG. 9B shows the case when the joystick lever 24 is moved to the right side at a positive deviation angle α, and the case when the joystick lever 24 is moved to the left side at a negative deviation angle α.

As shown in FIG. 9B, since the force imparting component 27 imparts a counterforce to the operation of the joystick lever 24 at a vehicle speed of 40 km/h, the lever counterforce at a vehicle speed of 40 km/h (L6) is greater than the lever counterforce when no force is imparted (L7).

At vehicle speeds of 25 km/h (L5) and 0 km/h (L4), since an assist force is imparted to the joystick lever 24 by the force applying portion 27, the lever counterforce at vehicle speeds of 25 km/h (L5) and 0 km/h (L4) is less than the lever counterforce when no force is imparted (L7).

As described above, when a force is imparted to the operation of the joystick lever 24 using the assist force information in FIG. 9A, the lever counterforce is lower at a low vehicle speed, and the lever counterforce is higher at a high vehicle speed.

Consequently, at low speed, since the lever counterforce is low, the joystick lever 24 is easier to operate and the operability is improved, but at high speed, since the lever counterforce is high, the joystick lever 24 is harder to operate, which improves travel stability.

As described above, the controller 28 stores the assist force information provided for each speed shown in FIG. 9A. The controller 28 may store the assist force information as a curve or straight line equation, or may store the assist force information as a table (a table of assist forces set for each lever input torque at predetermined intervals).

2-2-2. Control Operation

Figure 10:
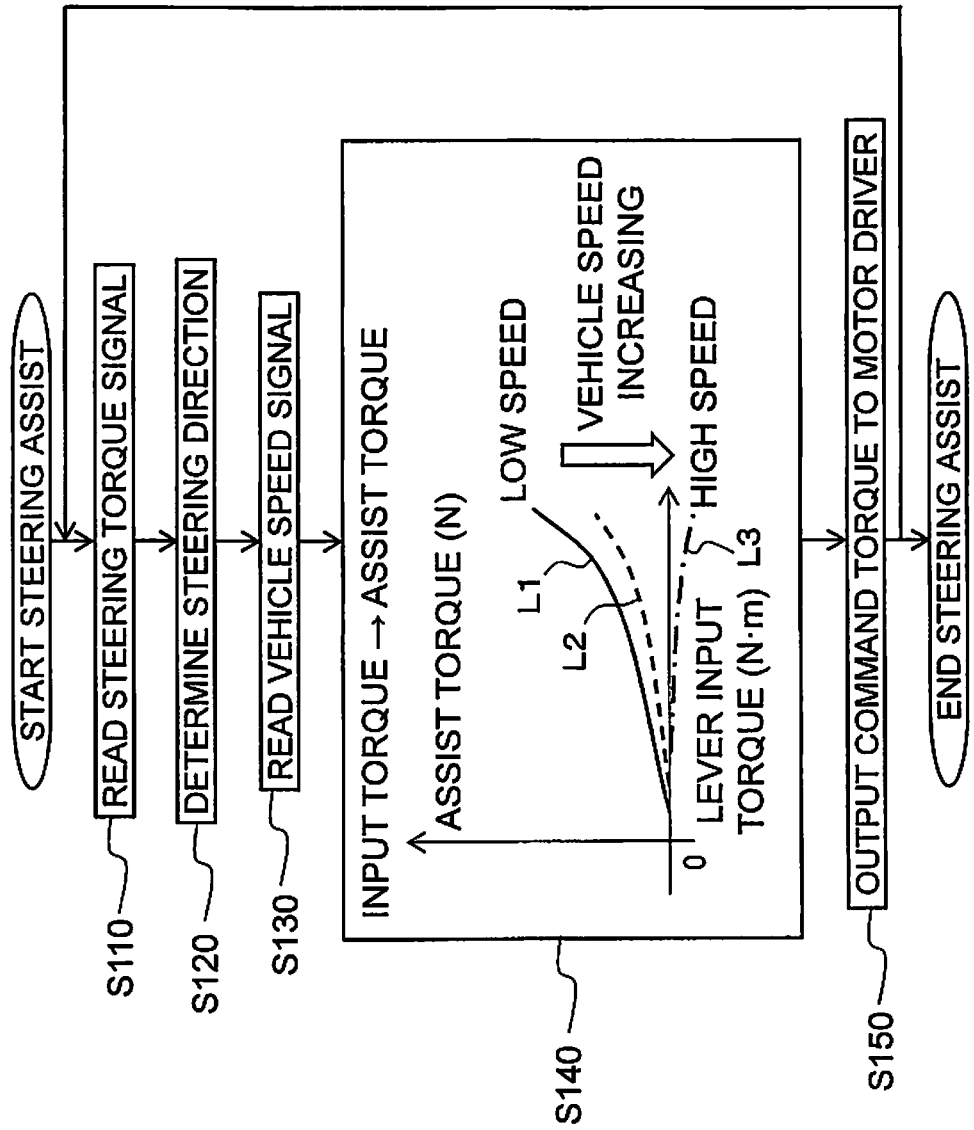
FIG. 10 is a flowchart of a method for controlling a wheel loader in Embodiment 1 pertaining to the present invention.

FIG. 10 is a flowchart of the control operation by the force imparting component 27.

When the joystick lever 24 is operated, in step S110 the controller 28 acquires the steering torque signal from the torque sensor 103. The steering torque signal is a signal including information about the rotation direction and the magnitude of the torque produced by that rotation.

Next, in step S120, the controller 28 determines the steering direction of the joystick lever 24 on the basis of the steering torque signal. This steering direction decides the rotation direction of the electric motor 111 when a force is imparted.

Then, in step S130, the controller 28 acquires the value sensed by the vehicle speed sensor 105.

Next, in step S140, the controller 28 decides the assist force on the basis of the stored assist force information (see FIG. 9A).

The controller 28 stores the three sets of assist torque information shown in FIG. 9A (at vehicle speeds of 0 km/h, 25 km/h, and 40 km/h). When the value sensed by the vehicle speed sensor 105 is within the three speeds (for example, 12 km/h), the controller 28 calculates the assist torque at that vehicle speed by interpolation. Thus, the assist torque can be continuously varied according to the speed change by calculating the assist torque by interpolation.

Next, in step S150, the controller 28 outputs a command torque to the drive circuit 204 on the basis of the decided assist torque and the rotation direction of the input shaft 81b (this could also be called the rotation direction of the joystick lever 24), the motor 111 is driven, and a force is imparted to the operation of the joystick lever 24 via the link 25.

Features, Etc.

(1)

As shown in FIG. 2, the wheel loader 1 pertaining to this embodiment (an example of a work vehicle) is an articulated wheel loader 1 in which the front frame 11 and the rear frame 12 are linked, and comprises the joystick lever 24, the force imparting component 27, the vehicle speed sensor 105 (an example of a speed sensor), and the controller 28. The joystick lever 24 changes the steering angle θs of the front frame 11 with respect to the rear frame 12 by operator operation. The force imparting component 27 imparts an assist force or counterforce to the operation of the joystick lever 24 by the operator. The vehicle speed sensor 105 senses the speed of the work vehicle. The controller controls the force imparting component 27 so that an assist force or a counterforce is imparted according to the speed sensed by the vehicle speed sensor 105.

Since an assist force or a counterforce can thus be applied to the operation of the joystick lever 24 according to the speed of the wheel loader 1, the operating force required to operate the joystick lever 24 can be changed.

Therefore, operability at low speed and linear stability at high speed can be improved by setting the force required to operate the joystick lever 24 to be low during low-speed travel and setting the force required to operate the joystick lever 24 to be high during high-speed travel.

Also, in contrast to a tracked work vehicle, the wheel loader 1 travels on tires, so the vehicle speed is higher. Therefore, achieving both good operability at low speed and good linear stability at high speed is more favorable with a work vehicle that travels on tires, such as the wheel loader 1.

(2)

With the wheel loader 1 in this embodiment (an example of a work vehicle), controller 28 controls the force imparting component 27 so that the higher is the speed sensed by the vehicle speed sensor 105, the more the operating force required to operate the joystick lever 24 is increased.

Consequently, as shown in FIG. 9B, the operating force required to operate the joystick lever 24 can be raised in steps as the speed rises.

Therefore, the tactile sensation of the joystick lever 24 becomes heavier at higher speeds, and the tactile sensation of the joystick lever 24 becomes lighter at lower speeds, so operability at low speed and linear stability at high speed can be improved.

(3)

With the wheel loader 1 in this embodiment (an example of a working vehicle), the controller 28 controls the force imparting component so that a counterforce is imparted when the speed sensed by the vehicle speed sensor 105 is at or above a specific preset speed as shown in 9A, and an assist force is imparted when the speed sensed by the vehicle speed sensor 105 is less than the specific preset speed.

When the wheel loader 1 is moving at a high speed, the tactile sensation can be made heavier by applying a counterforce when the joystick lever 24 is operated, which improves travel stability at high speed.

As to the specific speed, a speed of 25 km/h is used as a high speed threshold, for example, and the controller 28 determines the speed to be high when the speed sensed by the vehicle speed sensor 105 is at least 25 km/h, and imparts a counterforce to the operation of the joystick, lever 24 as shown in FIG. 9A. On the other hand, when the speed sensed by the vehicle speed sensor 105 is less than 25 km/h, the controller 28 determines that the speed to be medium or low, and imparts an assist force to the operation of the joystick lever 24.

The specific speed is not limited to 25 km/h, and may be set to a speed between 25 km/h and 40 km/h, as indicated by L2 and L3 in the graph in FIG. 9A.

(4)

As shown in FIG. 8, the wheel loader 1 in this embodiment (an example of a work vehicle) further comprises the torque sensor 103 (an example of a torque sensor). The controller 28 controls the force imparting component 27 so that an assist force or a counterforce is imparted to the operation of the joystick lever 24 according to the torque sensed by the torque sensor 103.

Consequently, a force can be applied according to the torque applied by the operator to the joystick lever 24. For example, the amount of force to be imparted can be controlled so that the assist force imparted by the force imparting component 27 is increased when the torque applied to the joystick lever 24 by the operator is high, and the assist force is decreased when the torque is low.

(5)

As shown in FIG. 2, the wheel loader 1 in this embodiment (an example of a work vehicle) comprises the steering cylinders 21 and 22 (an example of a hydraulic actuator) and the pilot valve 42 (an example of a control valve). The steering cylinders 21 and 22 change the steering angle θs. The pilot valve 42 is linked to the joystick lever 24 and controls the flow of fluid supplied to the steering cylinders 21 and 22. The pilot valve 42 has the operation input shaft 61 (an example of a first input member), the feedback input shaft 62 (an example of a second input member), the first spring 64 (an example of a biasing component), and the second spring 65 (an example of a biasing component). The operation input shaft 61 (an example of a first input member) is linked to the joystick lever 24 and is displaced according to the rotational angle of the joystick lever 24 (an example of an operation amount). The feedback input shaft 62 is displaced according to the steering angle θs. The first spring 64 and the second spring 65 bias the operation input shaft 61 to a neutral position Np in which the rotational angle θin of the operation input shaft 61 matches the rotation angle θfb of the feedback input shaft 62 (=θs) (an example of an amount of displacement). The pilot valve 42 controls the flow of fluid supplied to the steering cylinders 21 and 22 according to the difference α between the rotational angle θin of the operation input shaft 61 and the rotation angle θfb of the feedback input shaft 62 (=θs). The joystick lever 24 is operated against the biasing force of the first spring 64 and the second spring 65.

Consequently, after the joystick lever 24 is operated, the steering angle θs changes to follow the joystick lever 24, and the pilot valve 42 is the neutral position Np when the rotational angle θs of the joystick lever 24 matches the steering angle θs.

Also, the first spring 64 and second spring 65 are thus provided to the pilot valve 42, and the operator operates the joystick lever 24 with an operating force that goes against the biasing force of the first spring 64 and second spring 65. An assist force or counterforce can be imparted to this operation that goes against the biasing force.

(6)

The wheel loader 1 in this embodiment (an example of a work vehicle) further comprises the steering valve 32, as shown in FIG. 2. The steering valve 32 adjusts the flow of fluid supplied to the steering cylinders 21 and 22 (an example of a hydraulic actuator) on the basis of the pilot pressure inputted from the pilot valve 42 (an example of a control valve). The pilot valve 42 controls the flow of the fluid supplied from the steering valve 32 to the steering cylinders 21 and 22 by adjusting the pilot pressure.

Consequently, the pilot pressure is adjusted by operator operation, the amount of fluid supplied from the steering valve 32 to the steering cylinders 21 and 22 is controlled, and the steering angle θs of the front frame 11 with respect to the rear frame 12 is changed.

(7)

As shown in FIG. 2, the wheel loader 1 in this embodiment (an example of a work vehicle) further comprises the steering cylinders 21 and 22 (an example of a hydraulic actuator), the pilot valve 42 (an example of a control valve), and the link 25. The steering cylinders 21 and 22 change the steering angle θs. The pilot valve 42 is linked to the joystick lever 24 and controls the flow of fluid supplied to the steering cylinders 21 and 22. The link 25 links the joystick lever 24 to the pilot valve 42. The force imparting component 27 includes the electric motor 111 and the worm gear 112 (an example of a transmission mechanism). The electric motor 111 generates an assist force or a counterforce. The worm gear 112 transmits the assist force or counterforce produced by the electric motor 111 to the link 25.

Consequently, the force of the electric motor 111 can be transmitted to the link 25 that links the joystick lever 24 to the pilot valve 42, and the force required to operate the joystick lever 24 can be changed.

(8)

As shown in FIG. 10, the method for controlling the wheel loader 1 in this embodiment (an example of a work vehicle) is a method for controlling an articulated wheel loader 1 in which the front frame 11 and the rear frame 12 are linked, and comprises step S130 (an example of a speed sensing step) and steps S140 and S150 (an example of a force imparting step). Step S130 (an example of a speed sensing step) involves sensing the speed of the wheel loader 1. Steps S140 and S150 (an example of a force imparting step) involve imparting an assist force or a counterforce, according to the sensed speed, to the operation by the operator of the joystick lever 24 to change the steering angle θs of the front frame 11 with respect to the rear frame 12.

Since the assist force or counterforce can thus be imparted to operation of the joystick lever 24 according to the speed of the wheel loader 1, the operating force required to operate the joystick lever 24 can be changed.

Accordingly, operability at low speed and linear stability at high speed can be improved by setting the force required to operate the joystick lever 24 low during low-speed travel, and setting the force required to operate the joystick lever 24 high during high-speed travel.

OTHER EMBODIMENTS

An embodiment of the present invention was described above, but the present invention is not limited to or by the above embodiment, and various modifications are possible without departing from the gist of the invention.

(A)

Figure 11:
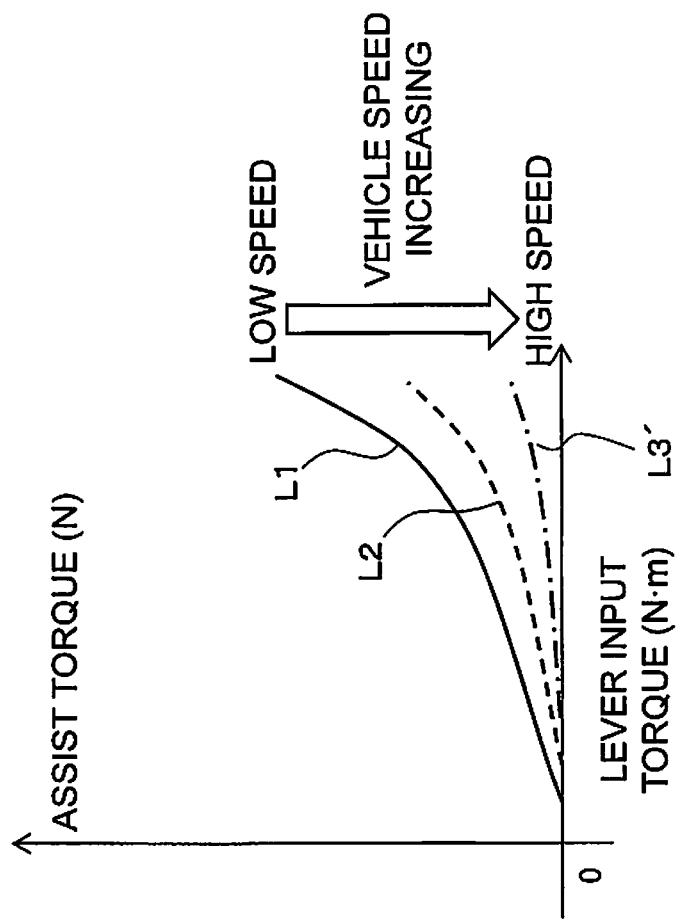
FIG. 11 is a graph of assist force versus lever input torque at three different vehicle speeds in this embodiment.

In the above embodiment, a counterforce was imparted to the operation of the joystick lever 24 at high speed (such as a vehicle speed of 40 km/h), but no counterforce may be imparted, and an assist force lower than at medium speed (such as a vehicle speed of 25 km/h) may be imparted. FIG. 11 shows the assist force at each speed versus the lever input torque in this case. As indicated by the assist torque information at L3' (one-dot change line) at a vehicle speed of 40 km/h, as the speed rises from low to high, the assist force is set to be lower.

Consequently, as the speed rises, the operating force required to operate the joystick lever can be increased continuously, and operability at low speed and linear stability at high speed can be improved.

(B)

In the above embodiment, counterforce was imparted to the operation of the joystick lever 24 only at high speed, but a counterforce may be imparted at medium speed, or at both medium and low speed as well. In this case, the setting may be such that as the speed rises, the amount of counterforce imparted increases.

(C)

In the above embodiment, the controller 28 stored assist force information for three speeds (0 km/h, 25 km/h, and 40 km/h), but the speeds are not limited to these. The first assist torque information is not limited to three sets, and there may be only two, or four or more. When the assist torque is smoothly varied according to speed, it is preferable for three or more sets of information to be provided.

(D)

In the above embodiment, the controller 28 stored three sets of assist torque information, and the assist torque was continuously varied according to the speed by interpolation, but it may instead varied in steps.

For instance, let the assist torque information at low speed be the solid line L1 in FIG. 9A, the assist torque information at medium speed be the dotted line L2 in FIG. 9A, and the assist torque information at high speed be the one-dot chain line L3 in FIG. 9A. Then, for example, let the low speed be less than 15 km/h, the medium speed be at least 15 km/h and less than 25 km/h, and the high speed be at least 25 km/h and no more than 40 km/hour. Also, for example, 15 km/h can be set as a first threshold, and 25 km/h as a second threshold.

In such a case, when the joystick lever 24 is operated, the controller 28 compares the speed sensed by the vehicle speed sensor 105 to the first threshold and the second threshold, and determines whether or not the vehicle speed corresponds to low, medium, or high speed. The assist torque information at the determined speed is then used to decide an assist torque from the steering torque signal. The number of stages is not limited to three, may be divided into only two stages, and may also be divided up more finely into more than three stages.

(E)

In the above embodiment, the operation direction of the joystick lever 24 was also sensed by the torque sensor 103, but the operation direction may be sensed on the basis of the change in the rotational angle obtained from the first rotational angle sensor 101, or on the basis of the angular difference ($\theta in-\theta s$) (also called the deviation angle) between the rotational angle $\theta in$ sensed by the first rotational angle sensor 101 and the rotational angle $\theta fb$ (=$\theta s$) sensed by the second rotational angle sensor 102.

In this case, the values sensed by the first rotational angle sensor 101 and the second rotational angle sensor 102 are inputted to the controller 28, and the controller 28 calculates the body-lever deviation angle $\alpha$. Then, in step S120 shown in FIG. 10, the steering direction of the joystick lever 24 is determined on the basis of the body-lever deflection angle $\alpha$.

Also, the body-lever deflection angle $\alpha$ may be calculated from the steering angle $\theta s$ sensed by the steering angle sensor 104 and the rotational angle $\theta in$ sensed by the first rotational angle sensor 101, without using the value sensed by the second rotational angle sensor 102.

Furthermore, the body-lever deflection angle $\alpha$ may be calculated from the rotational angle $\theta in$ sensed by the first rotational angle sensor 101 and the steering angle $\theta s$ calculated from the values sensed by the cylinder stroke sensors 106 and 107.

(F)

In the above embodiment, the joystick lever 24 and the pilot valve 42 were mechanically connected by the link 25, but this is not the only option. The joystick lever 24 and the pilot valve may not be mechanically connected, and the operation of the joystick lever 24 may be transmitted electrically to the pilot valve to operate the pilot valve.

Figure 12:
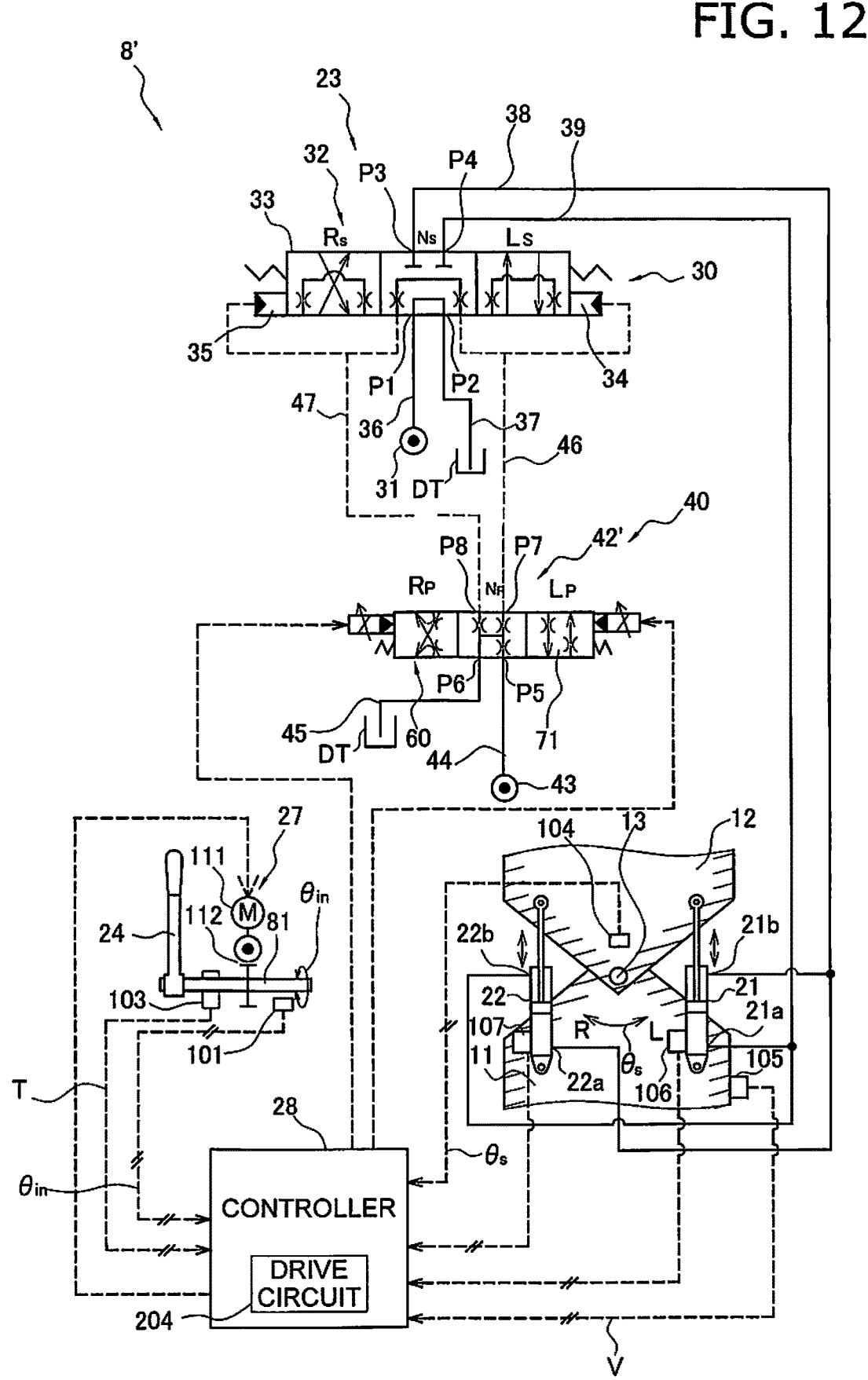
FIG. 12 is a configuration diagram of a steering operation device in a modification example of an embodiment pertaining to the present invention.

FIG. 12 is a diagram of a steering operation device 8' as an example of a configuration for electrically transmitting the operation of the joystick lever 24 to a pilot valve 42'. The pilot valve 42' shown in FIG. 12 is not a rotary type as in the above embodiment, but rather a spool type. The pilot valve 42' has a valve body component 60 that includes a sleeve (not shown) and a spool 71'. The spool 71' is able to move between a neutral position Np, a left pilot position Lp, and a right pilot position Rp according to a signal from the controller 28, and using the sleeve as a reference.

With the configuration shown in FIG. 12, for example, the universal joint 83 shown in FIG. 5 is not provided. The joystick lever 24 is connected to the steering operation shaft 81. The steering operation shaft 81 is not linked to the pilot valve. As in the above embodiment, the force imparting component 27 imparts an assist force or a counterforce to the steering operation shaft 81. The first rotational angle sensor 101 senses the rotational angle $\theta in$ of the steering operation shaft 81 and transmits it to the controller 28.

Also, with the steering operation unit 8', the pilot valve 42' is a spool type. The linking mechanism 26 for linking the pilot valve and the front frame 11 as shown in FIG. 5 is not provided. The steering angle sensor 104 senses the steering angle $\theta s$ of the front frame 11 with respect to the rear frame 12 and sends it to the controller 28.

The controller 28 sends a command to the pilot valve 42' and controls the movement of the spool 71' of the pilot valve 42' on the basis of the received information about the rotational angle $\theta in$ and the steering angle $\theta s$. The movement of the spool 71' changes the pilot pressure supplied from the pilot valve 42' to the steering valve 32, and changes the amount of fluid supplied from the steering valve 32 to the steering cylinders 21 and 22. Consequently, a steering operation is performed. At this point, the controller 28 may control the pilot pressure so that the difference between $\theta in$ and $\theta s$ is reduced, thereby making the rotational angle $\theta in$ match the steering angle $\theta s$.

Figure 13:
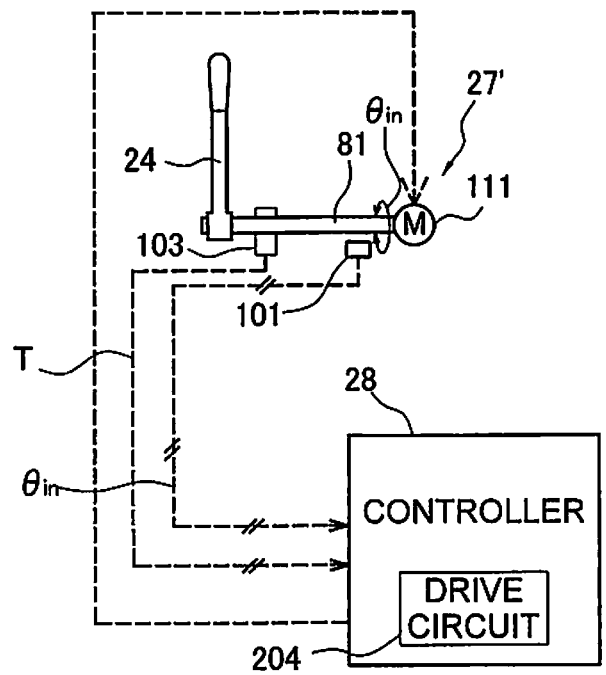
FIG. 13 is a configuration diagram of the force applying portion in a modification example of an embodiment pertaining to the present invention.

With the steering operation device 8', the force of the electric motor 111 is transmitted by the worm gear 112 to the steering operation shaft 81, but as with the force imparting component 27' shown in FIG. 13, the rotational shaft of the electric motor 111 may be connected directly to the steering operation shaft 81, without going through a reduction gear such as the worm gear 112.

With the steering apparatus 8 shown in FIG. 5, the joystick lever 24 itself is able to rotate around the shaft in the up and down direction, to the inside or the outside of the operator's seat. The configuration may be such that the joystick lever 24 itself is able to rotate horizontally around the shaft, to the inside or the outside of the operator's seat.

In other words, the configuration may be such that the pilot valve 42' is actuated on the basis of operation of the joystick lever 24, and the force from the force imparting component 27 can be transmitted to the joystick lever 24.

Electrical transmission may be performed either by wire or wirelessly.

(G)

In the above embodiment, the assist force is decided according to the value from a torque sensor, but a torque sensor may not be provided, and control may be performed so as to impart a uniform assist force for each speed. More specifically, regardless of the torque generated according to operation of the joystick lever 24, a constant assist force may be imparted for each of a high speed, a medium speed, and a low speed, with the value of the assist force decreasing for low speed, medium speed, and high speed in that order.

Determination of the movement of the joystick lever 24 to either the left or the right side can be performed on the basis of the change in the rotational angle of the first rotational angle sensor 101, as discussed above.

(H)

In the above embodiment, the configuration was such that the amount of fluid supplied from the steering valve 32 to the steering cylinders 21 and 22 according to the pilot pressure inputted from the pilot valve 42 (an example of a control valve) was controlled, but the configuration may instead be such the fluid from the pilot valve 42 is supplied directly to the steering cylinders 21 and 22.

(I)

In the above embodiment, two springs, namely the first spring 64 and the second spring 65, were provided, but the second spring 65 need not be provided. In this case, for example, the part between the feedback spool 73 and the feedback sleeve 74 may be fixed.

(J)

In the above embodiment, a force was generated by the electric motor 111, but instead of an electric motor, a hydraulic motor or the like may be used. In other words, it should be an actuator or the like with which the force to be imparted can be generated.

(K)

In the above embodiment, the drive circuit 204 was included in the controller 28, but it need not be included in the controller 28, and only the drive circuit 204 may be mounted by itself. Furthermore, the drive circuit 204 may be mounted to an electric motor.

(L)

In the above embodiment, the wheel loader 1 was given as an example of a work vehicle, but a wheel loader is not the only option, and may instead be an articulated dump truck, motor grader, or the like, so long as it is an articulated work vehicle.

INDUSTRIAL APPLICABILITY

The work vehicle and method for controlling a work vehicle of the present invention have the effect of improving operability at low speed and linear stability at high speed, and are useful in a wheel loader or the like.

The invention claimed is:

1. A work vehicle, the work vehicle being articulated with a front frame and a rear frame linked to the front frame, said work vehicle comprising:
   a joystick lever configured to change a steering angle of the front frame with respect to the rear frame by operation by an operator;
   a force imparting component configured to selectively impart one or the other of an assist force and a counterforce to operation of the joystick lever by the operator;
   a speed sensor configured to sense speed of the work vehicle; and
   a controller configured to control the force imparting component to impart the assist force or the counterforce according to the speed sensed by the speed sensor so that the higher the speed sensed by the speed sensor, the more an operating force required to operate the joystick lever is increased,
   the controller being further configured to control the force imparting component to selectively
   impart the counterforce when the speed sensed by the speed sensor is at or above a specific preset speed, and
   impart the assist force when the speed sensed by the speed sensor is less than the specific preset speed.

2. The work vehicle according to claim 1, wherein the controller is further configured to control the force imparting component so that the higher the speed sensed by the speed sensor, the more the assist force imparted to the joystick lever is decreased.

3. The work vehicle according to claim 1, further comprising
   a torque sensor configured to sense torque produced by operation of the joystick lever,
   the controller being further configured to control the force imparting component so as to impart the assist force or the counterforce to operation of the joystick lever according to the torque sensed by the torque sensor.

4. The work vehicle according to claim 1, further comprising
   a hydraulic actuator configured to change the steering angle of the front frame with respect to the rear frame;
   a control valve linked to the joystick lever and configured to control flow of fluid supplied to the hydraulic actuator; and
   a link linking the control valve to the joystick lever,
   the force imparting component including
     an electric motor configured to generate the assist force or the counterforce, and
     a transmission mechanism configured to transmit the assisting force or the counterforce produced by the electric motor to the link.

5. The work vehicle according to claim 1, wherein the force imparting component includes an electric motor and a worm gear.

6. The work vehicle according to claim 1, further comprising:
   a hydraulic cylinder disposed between the front frame and the rear frame to change the steering angle; and
   a pilot valve that is linked to the joystick lever and arranged to control a flow of hydraulic fluid to the hydraulic cylinder,
   the force imparting component is arranged between the joystick lever and the pilot valve.

7. The work vehicle according to claim 6, further comprising:
   a steering operation shaft operatively coupled between the joystick lever and an operation input shaft of the pilot valve,
   the force imparting component including an electric motor and a worm gear, the worm gear being arranged and configured to couple the electric motor to the steering operation shaft, the controller controlling the force imparting component by sending a command signal to the electric motor.

8. The work vehicle according to claim 1, further comprising
a hydraulic actuator configured to change the steering angle; and
a control valve linked to the joystick lever and configured to control flow of fluid supplied to the hydraulic actuator, the control valve including
a first input member linked to the joystick lever and configured to be displaced according to an amount of operation of the joystick lever,
a second input member configured to be displaced according to the steering angle, and
a biasing component biasing the first input member to a neutral position in which an amount of displacement of the first input member matches an amount of displacement of the second input member,
the control valve being configured to control the flow of fluid supplied to the hydraulic actuator according to a difference between the amount of displacement of the first input member with respect to the amount of displacement of the second input member, and
the joystick lever being operated against a biasing force produced by the biasing component.

9. The work vehicle according to 8, further comprising
a steering valve configured to adjust the flow of fluid supplied to the hydraulic actuator based on a pilot pressure inputted from the control valve,
the control valve being further configured to control the flow of fluid supplied from the steering valve to the hydraulic actuator by adjusting the pilot pressure.

10. A method for controlling an articulated work vehicle with a front frame and a rear frame linked to the front frame, the method comprising:
sensing speed of the work vehicle; and
selectively imparting one or the other of an assist force and a counterforce to an operation of a joystick lever that changes a steering angle of the front frame with respect to the rear frame,
the assist force or the counterforce being imparted so that the higher the speed sensed by the speed sensor, the more an operating force required to operate the joystick lever is increased,
the counterforce is imparted when the speed sensed by the speed sensor is at or above a specific preset speed, and
the assist force is imparted when the speed sensed by the speed sensor is less than the specific preset speed.

11. The work vehicle according to claim 10, wherein
the selective imparting of one or the other of the assist force and the counter force is accomplished by controlling an electric motor that is mechanically coupled to a shaft disposed between the joystick lever and a pilot valve, the pilot valve arranged to control a flow of hydraulic fluid to a hydraulic cylinder to change the steering angle.

\* \* \* \* \*